US012728409B2

(12) United States Patent
Peter et al.

(10) Patent No.: US 12,728,409 B2
(45) Date of Patent: Sep. 8, 2026

(54) SELECTIVE CATALYTIC REDUCTION CATALYST FOR THE TREATMENT OF AN EXHAUST GAS

(71) Applicant: BASF MOBILE EMISSIONS CATALYSTS LLC, Iselin, NJ (US)

(72) Inventors: Matthias Peter, Hannover (DE); Bjoern Neumann, Muenster (DE); Claudia Zabel, Hannover (DE); Maria Heenemann, Hannover (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 775 days.

(21) Appl. No.: 17/996,953

(22) PCT Filed: Apr. 28, 2021

(86) PCT No.: PCT/EP2021/061089
§ 371 (c)(1),
(2) Date: Oct. 24, 2022

(87) PCT Pub. No.: WO2021/219698
PCT Pub. Date: Nov. 4, 2021

(65) Prior Publication Data
US 2023/0173473 A1 Jun. 8, 2023

(30) Foreign Application Priority Data
Apr. 28, 2020 (EP) .................................... 20171796

(51) Int. Cl.
*B01J 29/76* (2006.01)
*B01D 46/00* (2022.01)
(Continued)

(52) U.S. Cl.
CPC ........ *B01J 29/763* (2013.01); *B01D 46/0027* (2013.01); *B01D 53/9418* (2013.01);
(Continued)

(58) Field of Classification Search
None
See application file for complete search history.

(56) References Cited

U.S. PATENT DOCUMENTS

2011/0142737 A1* 6/2011 Seyler ...................... B01J 29/85 502/65
2013/0121902 A1 5/2013 Adelmann et al.
(Continued)

FOREIGN PATENT DOCUMENTS

CN 107597182 A 1/2018
DE 102011012799 A1 3/2015
(Continued)

OTHER PUBLICATIONS

International Search Report dated Jul. 7, 2021, PCT/EP2021/061089.

*Primary Examiner* — Jelitza M Perez
(74) *Attorney, Agent, or Firm* — DLA Piper LLP (US)

(57) ABSTRACT

The present invention relates to a selective catalytic reduction catalyst for the treatment of an exhaust gas of a combustion engine, the catalyst comprising a substrate comprising an inlet end, an outlet end, a substrate axial length extending from the inlet end to the outlet end and a plurality of passages defined by internal walls of the substrate extending therethrough; a coating disposed on the substrate (i), the coating comprising a first non-zeolitic oxidic material comprising aluminum, an 8-membered ring pore zeolitic material comprising one or more of copper and iron, and a second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium; wherein at least 65 weight-% of the coating consist of the 8-membered ring pore zeolitic material comprising one or more of copper and iron.

16 Claims, 8 Drawing Sheets

(51) Int. Cl.

| | |
|---|---|
| ***B01D 53/94*** | (2006.01) |
| ***B01J 21/04*** | (2006.01) |
| ***B01J 23/10*** | (2006.01) |
| ***B01J 23/20*** | (2006.01) |
| ***B01J 35/56*** | (2024.01) |
| ***B01J 35/61*** | (2024.01) |
| ***B01J 37/02*** | (2006.01) |
| ***B01J 37/04*** | (2006.01) |
| ***B01J 37/08*** | (2006.01) |

(52) U.S. Cl.

CPC .......... *B01D 53/9477* (2013.01); *B01J 21/04* (2013.01); *B01J 23/10* (2013.01); *B01J 23/20* (2013.01); *B01J 35/56* (2024.01); *B01J 35/615* (2024.01); *B01J 37/0228* (2013.01); *B01J 37/0236* (2013.01); *B01J 37/0244* (2013.01); *B01J 37/04* (2013.01); *B01J 37/08* (2013.01); *B01D 2255/2063* (2013.01); *B01D 2255/2065* (2013.01); *B01D 2255/20715* (2013.01); *B01D 2255/20738* (2013.01); *B01D 2255/20761* (2013.01); *B01D 2255/2092* (2013.01); *B01D 2255/30* (2013.01); *B01D 2255/407* (2013.01); *B01D 2255/50* (2013.01); *B01D 2255/9155* (2013.01); *B01D 2255/9207* (2013.01); *B01D 2279/30* (2013.01)

(56) References Cited

U.S. PATENT DOCUMENTS

| | | | | |
|---|---|---|---|---|
| 2013/0156668 | A1 | 6/2013 | Spurk et al. | |
| 2015/0151288 | A1* | 6/2015 | Rivas-Cardona ...... | B01D 53/56 423/213.2 |
| 2017/0074139 | A1* | 3/2017 | Nilsson .................. | F01N 3/023 |

FOREIGN PATENT DOCUMENTS

| | | | |
|---|---|---|---|
| EP | 2335810 | A1 | 6/2011 |
| EP | 2985068 | A1 | 2/2016 |
| FR | 3004660 | A1 | 10/2014 |
| WO | WO-2014/080220 | A1 | 5/2014 |
| WO | WO-2020/040944 | A1 | 2/2020 |

* cited by examiner

SELECTIVE CATALYTIC REDUCTION CATALYST FOR THE TREATMENT OF AN EXHAUST GAS

This application is a national stage filing under 35 U.S.C. § 371 of International Application No. PCT/EP2021/061089, filed on Apr. 28, 2021, and claims priority to EP application Ser. No. 20171796.4, filed Apr. 28, 2020; the disclosure of each of these applications are incorporated herein by reference in their entirety.

The present invention relates to a selective catalytic reduction catalyst for the treatment of an exhaust gas of a combustion engine, a process for preparing a selective catalytic reduction catalyst for the treatment of an exhaust gas of a combustion engine, a use of said catalyst and a system containing said catalyst.

US 2011/0142737 A1 discloses a catalyst for selective catalytic reduction of nitrogen oxides in a diesel engine, the catalyst comprising a zeolite or zeolite-like compound and a cerium oxide or a mixed oxide of cerium-zirconium. DE 102011012799 A1 discloses a catalyst for the removal of nitrogen oxides from the exhaust gas of a diesel engine which comprises a support body and a catalytically active coating comprising one or more material zones. Finally, US 2013/0156668 A1 also discloses a catalyst for the removal of nitrogen oxides from the exhaust gas of a diesel engine, the latter consisting of a support body and a catalytically active coating comprising one or more material zones comprising: a zeolite or zeolite-like compound and at least one compound such as barium oxide, barium hydroxide, barium carbonate, strontium oxide, strontium hydroxide, strontium carbonate, etc. However, there is still a need to provide selective catalytic reduction catalysts which exhibit improved NOx conversions while maintaining or reducing the backpressure.

Therefore, it was an object of the present invention to provide a selective catalytic reduction catalyst for the treatment of an exhaust gas of a combustion engine exhibiting improved NOx conversion while maintaining or reducing the backpressure. Surprisingly, it has been found that the selective catalytic reduction catalyst for the treatment of an exhaust gas of a combustion engine according to the present invention permits to improve NOx conversion while maintaining or reducing the backpressure.

Therefore, the present invention relates to a selective catalytic reduction catalyst for the treatment of an exhaust gas of a combustion engine, the catalyst comprising:

(i) a substrate comprising an inlet end, an outlet end, a substrate axial length extending from the inlet end to the outlet end and a plurality of passages defined by internal walls of the substrate extending therethrough;

(ii) a coating disposed on the substrate (i), the coating comprising a first non-zeolitic oxidic material comprising aluminum, a second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, and the coating further comprising an 8-membered ring pore zeolitic material comprising one or more of copper and iron; wherein at least 65 weight-% of the coating consist of the 8-membered ring pore zeolitic material comprising one or more of copper and iron.

As to the first non-zeolitic oxidic material, it is preferred that it comprises alumina, wherein more preferably from 98 to 100 weight-%, more preferably from 99 to 100 weight-%, more preferably from 99.5 to 100 weight-%, of the first non-zeolitic material consist of alumina.

It is preferred that the first non-zeolitic material has a BET specific surface area in the range of from 120 to 300 $m^2/g$, more preferably in the range of from 150 to 250 $m^2/g$, more preferably in the range of from 170 to 220 $m^2/g$, the BET specific surface area being determined as defined in Reference Example 1.

It is alternatively preferred that the first non-zeolitic oxidic material further comprises one or more of zirconium, silicon and titanium, more preferably one or more of zirconium and silicon, more preferably silicon. It is more preferred, according to said alternative, that the first non-zeolitic material comprises aluminum and silicon. It is more preferred that from 98 to 100 weight %, more preferably from 99 to 100 weight-%, more preferably from 99.5 to 100 weight-%, of the first non-zeolitic oxidic material consist of aluminum, silicon and oxygen; wherein more preferably from 90 to 99 weight-%, more preferably from 92 to 96 weight-%, of the first non-zeolitic oxidic material consist of aluminum, calculated as $Al_2O_3$, and wherein more preferably from 1 to 10 weight-%, more preferably from 4 to 8 weight-%, of the first non-zeolitic oxidic material consist of silicon, calculated as $SiO_2$.

According to said alternative, it is preferred that the first non-zeolitic material has a BET specific surface area in the range of from 50 to 180 $m^2/g$, more preferably in the range of from 70 to 160 $m^2/g$, more preferably in the range of from 80 to 110 $m^2/g$, the BET specific surface area being determined as defined in Reference Example 1.

In the context of the present invention, it is preferred that the first non-zeolitic oxidic material is comprised in the coating (ii) in an amount in the range of from 2 to 28 weight-%, more preferably in the range of from 5 to 25 weight-%, more preferably in the range of from 6 to 18 weight-%, more preferably in the range of from 7 to 17 weight-%, more preferably in the range of from 8 to 15 weight-%, more preferably in the range of from 9 to 13 weight-%, based on the weight of the 8-membered ring pore zeolitic material.

As to the second non-zeolitic oxidic material comprised in the coating (ii), it is preferred that it comprises a mixed oxide of cerium and one or more of zirconium, aluminum, silicon, lanthanum, niobium, iron, manganese, titanium, tungsten, copper, molybdenum, neodymium, cobalt, chromium, tin and praseodymium, or a mixture of a cerium oxide and an oxide of one or more of zirconium, aluminum, silicon, lanthanum, niobium, iron, manganese, titanium, tungsten, copper, molybdenum, neodymium, cobalt, chromium, tin and praseodymium.

It is preferred that, when the second non-zeolitic oxidic material comprised in the coating (ii) comprises a mixed oxide, said material comprises a mixed oxide of cerium and one or more of zirconium, aluminum, silicon, lanthanum, niobium, iron, manganese, titanium, tungsten, copper, molybdenum, neodymium, cobalt, chromium, tin and praseodymium, more preferably a mixed oxide of cerium and one or more of zirconium, aluminum and silicon. It is more preferred that, when the second non-zeolitic oxidic material comprised in the coating (ii) comprises a mixed oxide, said material comprises a mixed oxide of cerium and zirconium.

It is preferred that the mixed oxide of cerium and zirconium has a crystalline phase $Ce_aZr_{1-a}O_2$, wherein a is in the range of from 0.1 to 0.9, more preferably in the range of from 0.2 to 0.8, more preferably in the range of from 0.25 to 0.75.

It is preferred that, when the second non-zeolitic oxidic material comprised in the coating (ii) comprises a mixed oxide, said material additionally comprises an oxide of one or more of lanthanum, niobium, iron, manganese, titanium, tungsten, copper, molybdenum, neodymium, cobalt, chromium, tin and praseodymium, more preferably an oxide of one or more of lanthanum and niobium, more preferably an oxide of lanthanum or more preferably an oxide of niobium.

It is preferred that the oxide of one or more of lanthanum, niobium, iron, manganese, titanium, tungsten, copper, molybdenum, neodymium, cobalt, chromium, tin and praseodymium is supported on the mixed oxide. It is more preferred that lanthanum is supported on the mixed oxide of cerium and zirconium.

It is preferred that the oxide of one or more of lanthanum, niobium, iron, manganese, titanium, tungsten, copper, molybdenum, neodymium, cobalt, chromium, tin and praseodymium is comprised in the second non-zeolitic oxidic material comprised in the coating (ii) in an amount in the range of from 2 to 25 weight-%, more preferably in the range of from 3 to 20 weight-%, more preferably in an amount of 4 to 16 weight-%, based on the weight of the mixed oxide.

It is preferred that the second non-zeolitic oxidic material comprises, more preferably consists of, the oxide of one or more of lanthanum and niobium, more preferably the oxide of lanthanum or niobium, and a mixed oxide of cerium and one or more of zirconium, aluminum and silicon, more preferably a mixed oxide of cerium and zirconium, wherein the lanthanum or the niobium oxide more preferably is supported on the mixed oxide of cerium and zirconium.

Preferably from 98 to 100 weight-%, more preferably from 99 to 100 weight-%, more preferably from 99.5 to 100 weight-%, of the second non-zeolitic oxidic material consist of a mixed oxide of cerium and one or more of zirconium, aluminum, silicon, lanthanum, niobium, iron, manganese, titanium, tungsten, copper, molybdenum, neodymium, cobalt, chromium, tin and praseodymium, and more preferably an oxide as defined in the foregoing.

It is more preferred that the first non-zeolitic oxidic material comprises alumina, wherein more preferably from 98 to 100 weight-%, more preferably from 99 to 100 weight-%, more preferably from 99.5 to 100 weight-%, of the first non-zeolitic material consist of alumina, and that the second non-zeolitic oxidic material comprises a mixed oxide of cerium and one or more of zirconium, aluminum and silicon, more preferably a mixed oxide of cerium and zirconium.

It is more preferred that the first non-zeolitic oxidic material comprises alumina, wherein more preferably from 98 to 100 weight-%, more preferably from 99 to 100 weight-%, more preferably from 99.5 to 100 weight-%, of the first non-zeolitic material consist of alumina, and that the second non-zeolitic oxidic material comprises a mixed oxide of cerium and zirconium and additionally comprises an oxide of lanthanum.

It is alternatively more preferred that the first non-zeolitic oxidic material comprises aluminum and silicon and that the second non-zeolitic oxidic material comprises a mixed oxide of cerium and one or more of zirconium, aluminum and silicon, more preferably a mixed oxide of cerium and zirconium.

According to said alternative, it is more preferred that the first non-zeolitic oxidic material comprises aluminum and silicon and that that the second non-zeolitic oxidic material comprises a mixed oxide of cerium and zirconium and additionally comprises an oxide of lanthanum.

In the context of the present invention, it is preferred that, when the second non-zeolitic oxidic material comprised in the coating (ii) does not comprise a mixed oxide, said material comprises a mixture of a cerium oxide and one or more of a zirconium oxide, an aluminum oxide, a silicon oxide, a lanthanum oxide, a niobium oxide, an iron oxide, a manganese oxide, a titanium oxide, a tungsten oxide, a copper oxide, a molybdenum oxide, a neodymium oxide, a cobalt oxide, a chromium oxide, a tin oxide and a praseodymium oxide, more preferably a mixture of a cerium oxide and one or more of a zirconium oxide, an aluminum oxide, a silicon oxide, a lanthanum oxide and a niobium oxide, more preferably a mixture of a cerium oxide and one or more of an aluminum oxide, a lanthanum oxide and a niobium oxide.

It is more preferred that the second non-zeolitic oxidic material comprised in the coating (ii) comprises a mixture of a cerium oxide, an aluminum oxide and a lanthanum oxide.

Preferably from 98 to 100 weight-%, more preferably from 99 to 100 weight-%, more preferably from 99.5 to 100 weight-%, of the second non-zeolitic oxidic material comprised in the coating (ii) consist of a mixture of a cerium oxide, an aluminum oxide and a lanthanum oxide, wherein more preferably from 2 to 20 weight-%, more preferably from 5 to 15 weight-%, of the second non-zeolitic material consist of lanthanum, calculated as $La_2O_3$.

It is more preferred that the first non-zeolitic oxidic material comprises alumina, wherein more preferably from 98 to 100 weight-%, more preferably from 99 to 100 weight-%, more preferably from 99.5 to 100 weight-%, of the first non-zeolitic material consist of alumina, and that the second non-zeolitic oxidic material comprised in the coating (ii) comprises a mixture of a cerium oxide, an aluminum oxide and a lanthanum oxide.

Alternatively, when the second non-zeolitic oxidic material comprised in the coating (ii) does not comprise a mixed oxide, it is more preferred that said material comprises a mixture of a cerium oxide, an aluminum oxide and a niobium oxide.

Preferably from 98 to 100 weight-%, more preferably from 99 to 100 weight-%, more preferably from 99.5 to 100 weight-%, of the second non-zeolitic oxidic material comprised in the coating (ii) consist of a mixture of a cerium oxide, an aluminum oxide and a niobium oxide, wherein more preferably from 2 to 20 weight-%, more preferably from 5 to 15 weight-%, of the second non-zeolitic material consist of niobium, calculated as $Nb_2O_5$.

It is more preferred that the first non-zeolitic oxidic material comprises alumina, wherein more preferably from 98 to 100 weight-%, more preferably from 99 to 100 weight-%, more preferably from 99.5 to 100 weight-%, of the first non-zeolitic material consist of alumina and that the second non-zeolitic oxidic material comprised in the coating (ii) comprises a mixture of a cerium oxide, an aluminum oxide and a niobium oxide.

In the context of the present invention, it is preferred that the second non-zeolitic oxidic material has a BET specific surface area in the range of from 50 to 700 $m^2/g$, more preferably in the range of from 60 to 600 $m^2/g$, more preferably in the range of from 70 to 580 $m^2/g$, determined as described in Reference Example 1.

It is preferred that the second non-zeolitic oxidic material is comprised in the coating (ii) in an amount in the range of from 15 to 35 weight-%, more preferably in the range of from 16 to 30 weight-%, more preferably in the range of from 17 to 25 weight-%, based on the weight of the 8-membered ring pore zeolitic material. It is more preferred that the second non-zeolitic oxidic material is comprised in the coating (ii) in an amount in the range of from 18 to 23 weight-%, based on the weight of the 8-membered ring pore zeolitic material.

It is preferred that the ratio of the weight of the first non-zeolitic oxidic material, (w1), to the weight of the second non-zeolitic oxidic material, (w2), defined as (w1):(w2), is in the range of from 0.2:1 to 0.7:1, more preferably in the range of from 0.3:1 to 0.6:1, more preferably in the range of from 0.4:1 to 0.55:1, more preferably in the range of from 0.45:1 to 0.55:1.

As to the 8-membered ring pore zeolitic material comprised in the coating (ii), it is preferred that it has a framework type selected from the group consisting of CHA, AEI, RTH, LEV, DDR, KFI, ERI, AFX, LTA, a mixture of two or more thereof and a mixed type of two or more thereof, more preferably selected from the group consisting of CHA, AEI, RTH, a mixture of two or more thereof and a mixed type of two or more thereof, more preferably selected from the group consisting of CHA and AEI. It is more preferred that the 8-membered ring pore zeolitic material comprised in the coating (ii) has a framework type CHA.

It is preferred that the zeolitic material comprised in the coating (ii) comprises copper, wherein the amount of copper in the zeolitic material, calculated as CuO, more preferably is in the range of from 0.1 to 10 weight-%, more preferably in the range of from 1.5 to 5.5 weight-%, more preferably in the range of from 2.5 to 5.0 weight-%, more preferably in the range of from 3.0 to 4.75 weight-%, more preferably in the range of from 3.25 to 4.5 weight-%, based on the weight of the zeolitic material.

It is preferred that the amount of iron comprised in the zeolitic material, calculated as $Fe_2O_3$, is in the range of from 0 to 0.01 weight-%, more preferably in the range of from 0 to 0.001 weight %, more preferably in the range of from 0 to 0.0001 weight-%, based on the weight of the zeolitic material. In other words, it is preferred that the zeolitic material is substantially free, more preferably free, of iron.

Preferably from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O, and optionally H, wherein in the framework structure, the molar ratio of Si to Al, calculated as molar $SiO_2:Al_2O_3$, more preferably is in the range of from 2:1 to 50:1, more preferably in the range of from 5:1 to 45:1, more preferably in the range of from 10:1 to 40:1, more preferably in the range of from 13:1 to 30:1, more preferably in the range of from 14:1 to 27:1, more preferably in the range of from 15:1 to 26:1.

It is more preferred that the molar ratio of Si to Al, calculated as molar $SiO_2:Al_2O_3$, is in the range of from 15:1 to 20:1, more preferably in the range of from 16:1 to 19:1. Alternatively, it is more preferred that the molar ratio of Si to Al, calculated as molar $SiO_2:Al_2O_3$, is in the range of from 22:1 to 26:1.

It may also be preferred that the zeolitic material comprised in the coating (ii) comprises iron, wherein the amount of iron comprised in the zeolitic material, calculated as $Fe_2O_3$, more preferably is in the range of from 0.1 to 10.0 weight-%, more preferably in the range of from 0.5 to 7.0 weight-%, more preferably in the range of from 1.0 to 5.5 weight-%, more preferably in the range of from 2.0 to 5.5 weight-%, based on the weight of the zeolitic material. It is more preferred that from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O, and optionally H, wherein in the framework structure, the molar ratio of Si to Al, calculated as molar $SiO_2:Al_2O_3$, more preferably is in the range of from 2:1 to 50:1, more preferably in the range of from 5:1 to 45:1, more preferably in the range of from 10:1 to 40:1, more preferably in the range of from 13:1 to 30:1, more preferably in the range of from 14:1 to 27:1, more preferably in the range of from 15:1 to 26:1. It is more preferred that the molar ratio of Si to Al, calculated as molar $SiO_2:Al_2O_3$, is in the range of from 15:1 to 20:1, more preferably in the range of from 16:1 to 19:1. Alternatively, it is more preferred that the molar ratio of Si to Al, calculated as molar $SiO_2:Al_2O_3$, is in the range of from 22:1 to 26:1.

As to the 8-membered ring pore zeolitic material comprised in the coating (ii), preferably having a framework type CHA, it is preferred that it comprises crystals having an average crystal size in the range of from 0.05 to 5 micrometers, more preferably in the range of from 0.06 to 2 micrometers, more preferably in the range of from 0.07 to 1 micrometer, more preferably in the range of from 0.1 to 0.8 micrometer, more preferably in the range of from 0.2 to 0.6 micrometer, the average crystal size being determined as in Reference Example 8.

It is preferred that the 8-membered ring pore zeolitic material comprised in the coating (ii), more preferably having a framework type CHA, has a BET specific surface area in the range of from 50 to 900 $m^2/g$, more preferably in the range of from 150 to 700 $m^2/g$, more preferably in the range of from 250 to 650 $m^2/g$, determined as described in Reference Example 1.

Preferably from 65 to 80 weight-%, more preferably from 70 to 78 weight-%, more preferably from 72 to 76 weight-%, of the coating (ii) consist of the 8-membered ring pore zeolitic material comprising one or more of copper and iron.

It is more preferred that the 8-membered ring pore zeolitic material is comprised in the coating (ii) at a loading in the range of from 0.5 to 5 $g/in^3$, more preferably in the range of from 0.75 to 4 $g/in^3$, more preferably in the range of from 1 to 3 $g/in^3$.

It is more preferred that the coating (ii) further comprises an oxidic binder. It is preferred that the oxidic binder comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia.

It is preferred that the oxidic binder, more preferably zirconia, is comprised in the coating (ii) in an amount in the range of from 0.1 to 8 weight-%, more preferably in the range of from 1 to 7 weight-%, more preferably in the range of from 2 to 6.5 weight-%, more preferably in the range of from 3 to 6 weight-%, more preferably in the range of from 4 to 5.5 weight-%, based on the weight of the 8-membered ring pore zeolitic material.

It is preferred that the loading of the coating (ii) is in the range of from 1 to 5 $g/in^3$, more preferably in the range of from 1.5 to 3 $g/in^3$, more preferably in the range of from 1.75 to 2.5 $g/in^3$.

It is preferred that the coating (ii) extends over x % of the substrate axial length, more preferably from the inlet end to the outlet end of the substrate, wherein x is in the range of from 80 to 100, more preferably in the range of from 90 to 100, more preferably in the range of from 95 to 100, more preferably in the range of from 98 to 100.

Preferably from 98 to 100 weight-%, more preferably from 99 to 100 weight-%, more from 99.5 to 100 weight-%, of the coating (ii) consist of the first non-zeolitic oxidic material comprising aluminum, the second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, the 8-membered ring pore zeolitic material comprising one or more of copper and iron, and more preferably the oxidic binder as defined in the foregoing.

It is preferred that from 0 to 0.001 weight-%, more preferably from 0 to 0.0001 weight-%, more preferably from 0 to 0.00001 weight-%, of the coating (ii) consists of platinum, more preferably of platinum, palladium and rhodium, more preferably of any platinum group metals. In other words, it is preferred that the coating (ii) is substantially free, more preferably free of, platinum, more preferably of platinum, palladium and rhodium, more preferably of any platinum group metals.

It is preferred that from 0 to 0.01 weight-%, more preferably from 0 to 0.001 weight-%, more preferably from 0 to 0.0001 weight-%, of the coating (ii) consists of vanadium. In other words, it is preferred that the coating (ii) is substantially free, more preferably free of, vanadium.

It is preferred that the coating (ii) is disposed on the surface of the internal walls of the substrate, which surface defines the interface between the internal walls and the passages, and/or within the internal walls of the substrate.

It is preferred that the substrate is a wall-flow filter substrate or a flow-through substrate, more preferably a wall-flow filter substrate, wherein the plurality of passages more preferably comprise inlet passages having an open inlet end and a closed outlet end, and outlet passages having a closed inlet end and an open outlet end.

It is preferred that the wall-flow filter substrate is a porous wall-flow filter substrate, wherein the wall-flow filter substrate more preferably is one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate. It is more preferred that the coating (ii) is disposed within the internal walls of the porous wall flow filter and on the surface of the internal walls of the substrate, wherein more preferably at least 95 weight-%, more preferably at least 98 weight-%, of the coating (ii) is within the internal walls of the substrate. The amount of coating within and/or on the internal walls of the substrate is determined by electron microscopy, such as TEM.

It is preferred that the catalyst of the present invention consists of the substrate (i) and the coating (ii).

The present invention further relates to a process for preparing a selective catalytic reduction catalyst for the treatment of an exhaust gas of a combustion engine, preferably the selective catalytic reduction catalyst according to the present invention, the process comprising (a) preparing a mixture comprising water, a first non-zeolitic oxidic material comprising aluminum, a second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, and an 8-membered ring pore zeolitic material comprising one or more of copper and iron;
(b) disposing the mixture obtained according to (a) on a substrate, the substrate comprising an inlet end, an outlet end, a substrate axial length extending from the inlet end to the outlet end and a plurality of passages defined by internal walls of the substrate extending therethrough, obtaining a mixture-treated substrate;
(c) calcining the mixture-treated substrate obtained according to (b), obtaining the substrate having a coating disposed thereon, wherein at least 65 weight-% of the coating consist of the 8-membered ring pore zeolitic material comprising one or more of copper and iron.

As to (a), it is preferred that it comprises, more preferably consists of, (a.1) preparing a first aqueous mixture comprising an 8-membered ring pore zeolitic material and one or more of a copper salt and an iron salt, more preferably a copper salt; or preparing a first aqueous mixture comprising an 8-membered ring pore zeolitic material comprising copper and one or more of a copper salt and an iron salt, more preferably a copper salt;
  calcining of the obtained first aqueous mixture, preferably in a gas atmosphere having a temperature in the range of from 300 to 700° C., the gas atmosphere more preferably being air, obtaining the 8-membered ring pore zeolitic material comprising one or more of copper and iron, more preferably copper;
(a.2) preparing a second aqueous mixture comprising water and a first non-zeolitic oxidic material comprising aluminum;
  impregnating the second aqueous mixture on the 8-membered ring pore zeolitic material comprising one or more of copper and iron obtained according to (a.1);
  calcining, more preferably in a gas atmosphere having a temperature in the range of from 300 to 700° C., the gas atmosphere more preferably being air, obtaining the first non-zeolitic oxidic material comprising aluminum with the 8-membered ring pore zeolitic material comprising one or more of copper and iron, more preferably copper;
(a.3) preparing a third aqueous mixture comprising water, the first non-zeolitic oxidic material comprising aluminum with the 8-membered ring pore zeolitic material comprising one or more of copper and iron obtained according to (a.2), and more preferably a precursor of an oxidic binder;
(a.4) more preferably milling the third aqueous mixture obtained according to (a.3), more preferably until the particles of said mixture have a Dv90 in the range of from 1 to 10 micrometers, more preferably in the range of from 2 to 7 micrometers, more preferably in the range of from 3 to 5 micrometers, the Dv90 being determined as described in Reference Example 3;
(a.5) preparing a fourth aqueous mixture comprising water, the second non-zeolitic oxidic material, and more preferably an acid, more preferably an organic acid;
(a.6) admixing the third aqueous mixture obtained according to (a.3), more preferably to (a.4), and the fourth aqueous mixture obtained according to (a.5).

It is preferred that calcining in (a.1) is performed in a gas atmosphere having a temperature in the range of from 400 to 600° C., more preferably in the range of from 450 to 550° C.

It is preferred that calcining in (a.1) is performed in a gas atmosphere is performed for a duration in the range of from 0.5 to 4 hours, more preferably in the range of from 1 to 3 hours.

It is preferred that the gas atmosphere comprises oxygen, more preferably is air.

It is preferred that calcining in (a.2) is performed in a gas atmosphere having a temperature in the range of from 400 to 600° C., more preferably in the range of from 450 to 550° C. It is preferred that calcining in (a.2) is performed in a gas atmosphere for a duration in the range of from 0.5 to 4 hours, more preferably in the range of from 1 to 3 hours.

It is preferred that the gas atmosphere comprises oxygen, more preferably is air.

It is preferred that the precursor of an oxidic binder comprised in the third aqueous mixture is one or more of an aluminum salt, a silicon salt, a zirconium salt, and a titanium salt, more preferably one or more of a zirconium salt, and an aluminum salt, more preferably a zirconium salt, more preferably zirconium acetate.

It is preferred that the third aqueous mixture prepared according to (a.3) further comprises an acid, more preferably an organic acid, wherein the organic acid more preferably is one or more of a tartaric acid, an acetic acid, a citric acid, a nitric acid, a hydrochloric acid and a sulfuric acid, wherein the organic acid more preferably is an acetic acid.

It is preferred that the organic acid comprised in the fourth aqueous mixture prepared according to (a.5) is one or more of a tartaric acid, an acetic acid, a citric acid, a nitric acid, a hydrochloric acid and a sulfuric acid.

As to (a), it is alternatively preferred that it comprises, more preferably consists of, (a.1') preparing a first aqueous mixture comprising an 8-membered ring pore zeolitic material comprising copper and one or more of a copper oxide and an iron oxide, more preferably a copper oxide;

(a.2') preparing a second aqueous mixture comprising water, a first non-zeolitic oxidic material comprising aluminum, and more preferably an acid, more preferably an organic acid;

(a.3') admixing the first aqueous mixture obtained according to (a.1') and the second aqueous mixture obtained according to (a.2'), obtaining a third aqueous mixture;

(a.4') preparing a fourth aqueous mixture comprising water, the second non-zeolitic oxidic material, and more preferably an acid, more preferably an organic acid;

(a.5') admixing the third aqueous mixture obtained according to (a.3') and the fourth aqueous mixture obtained according to (a.4').

It is preferred that (a.1') comprises, more preferably consists of, (a.1'.1) preparing a mixture comprising water and the one or more of a copper oxide and an iron oxide, more preferably a copper oxide, more preferably CuO;

(a.1'.2) more preferably milling the mixture prepared according to (a.1'.1), more preferably until the particles of said mixture have a Dv90 in the range of from 3 to 20 micrometers, more preferably in the range of from 6 to 10 micrometers, the Dv90 being determined as described in Reference Example 3;

(a.1'.3) more preferably adding a precursor of an oxidic binder in the mixture obtained according to (a.1'.1), more preferably (a.1'.2), wherein the precursor of an oxidic binder more preferably is as defined in the foregoing;

(a.1'.4) preparing a mixture comprising water and a 8-membered ring pore zeolitic material comprising copper;

(a.1'.5) admixing the mixture prepared according to (a.1'.4) with the mixture prepared according to (a.1'.1), more preferably to (a.1'.2), more preferably to (a.1'.3).

It is preferred that the organic acid comprised in the second aqueous mixture prepared according to (a.2') is one or more of a tartaric acid, an acetic acid, a citric acid, a nitric acid, a hydrochloric acid and a sulfuric acid.

It is preferred that the organic acid comprised in the second aqueous mixture prepared according to (a.4') is one or more of a tartaric acid, an acetic acid, a citric acid, a nitric acid, a hydrochloric acid and a sulfuric acid.

In the context of the present invention, it is preferred that the first non-zeolitic oxidic material is as defined in the foregoing with the catalyst of the present invention.

It is preferred that the second non-zeolitic oxidic material is as defined in the foregoing with the catalyst of the present invention.

It is preferred that the 8-membered ring pore zeolitic material is as defined in the foregoing with the catalyst of the present invention.

It is preferred that disposing the mixture obtained according to (a) on the substrate according to (b) is performed by dipping the substrate in the mixture obtained according to (a).

It is preferred that the substrate is as defined in the foregoing with the catalyst according to the present invention.

According to (b), it is preferred that the mixture prepared according to (a) is disposed on the substrate over x % of the substrate axial length, wherein x is in the range of from 80 to 100, more preferably in the range of from 90 to 100, more preferably in the range of from 95 to 100, more preferably in the range of from 98 to 100.

It is preferred that the mixture prepared according to (a) is disposed on the substrate from the inlet end to the outlet end of the substrate.

It is preferred that (b) further comprises after disposing the mixture obtained in (a) on the substrate, drying the mixture-treated substrate, more preferably in a gas atmosphere having a temperature in the range of from 50 to 300° C., more preferably in the range of from 60 to 190° C., the gas atmosphere more preferably being air.

It is preferred that drying is performed for a duration in the range of from 0.1 to 240 minutes, more preferably in the range of from 0.15 to 120 minutes.

It is preferred that (b) further comprises (b.1) disposing a first portion of the mixture obtained in (a) on a substrate comprising an inlet end, an outlet end, a substrate axial length extending from the inlet end to the outlet end and a plurality of passages defined by internal walls of the substrate extending therethrough, the disposing more preferably being from the inlet end toward the outlet end of the substrate; and drying the substrate comprising the first portion of the mixture disposed thereon;

(b.2) disposing a second portion of the mixture obtained in (i) on the substrate comprising the first portion of the mixture disposed thereon obtained in (b.2), the disposing more preferably being from the inlet end toward the outlet end of the substrate; and more preferably drying the substrate comprising the first and the second portion of the mixture disposed thereon.

As to calcining according to (c), it is preferred that it is performed in a gas atmosphere having a temperature in the range of from 300 to 800° C., more preferably in the range of from 350 to 700° C., the gas atmosphere more preferably being air.

As to calcining according to (c), it is preferred that it is performed in a gas atmosphere for a duration in the range of from 10 to 240 minutes, more preferably in the range of from 20 to 160 minutes, the gas atmosphere more preferably being air.

It is preferred that the process according to the present invention consists of (a), (b), (c) and (d).

The present invention further relates to a selective catalytic reduction catalyst, preferably a selective catalytic reduction catalyst according to the present invention and as defined above, obtained or obtainable by a process according to the present invention.

The present invention further relates to a use of a selective catalytic reduction catalyst according to the present invention for the selective catalytic reduction of nitrogen oxide.

The present invention further relates to a method for the selective catalytic reduction of nitrogen oxide, the method comprising (1) providing the exhaust gas stream, preferably from a combustion engine, more preferably a diesel engine;

(2) passing the exhaust gas stream provided in (1) through a selective catalytic reduction catalyst according to the present invention.

The present invention further relates to an exhaust gas treatment system for treating an exhaust gas stream exiting a combustion engine, preferably a diesel engine, said exhaust gas treatment system having an upstream end for introducing said exhaust gas stream into said exhaust gas treatment system, wherein said exhaust gas treatment system comprises a first selective catalytic reduction catalyst according to the present invention and as defined above, and one or more of a diesel oxidation catalyst, a second selective catalytic reduction catalyst, an ammonia oxidation catalyst, a diesel oxidation catalyst containing a $NO_x$ storage function and a particulate filter.

The present invention is further illustrated by the following set of embodiments and combinations of embodiments resulting from the dependencies and back-references as indicated. In particular, it is noted that in each instance where a range of embodiments is mentioned, for example in the context of a term such as "The catalyst of any one of embodiments 1 to 4", every embodiment in this range is meant to be explicitly disclosed for the skilled person, i.e. the wording of this term is to be understood by the skilled person as being synonymous to "The catalyst of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A selective catalytic reduction catalyst for the treatment of an exhaust gas of a combustion engine, the catalyst comprising:

(i) a substrate comprising an inlet end, an outlet end, a substrate axial length extending from the inlet end to the outlet end and a plurality of passages defined by internal walls of the substrate extending therethrough;

(ii) a coating disposed on the substrate (i), the coating comprising a first non-zeolitic oxidic material comprising aluminum, a second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, and the coating further comprising an 8-membered ring pore zeolitic material comprising one or more of copper and iron; wherein at least 65 weight-% of the coating consist of the 8-membered ring pore zeolitic material comprising one or more of copper and iron.

2. The catalyst of embodiment 1, wherein the first non-zeolitic oxidic material comprises alumina, wherein preferably from 98 to 100 weight-%, more preferably from 99 to 100 weight-%, more preferably from 99.5 to 100 weight-%, of the first non-zeolitic material consist of alumina, wherein the first non-zeolitic material more preferably has a BET specific surface area in the range of from 120 to 300 $m^2/g$, more preferably in the range of from 150 to 250 $m^2/g$, more preferably in the range of from 170 to 220 $m^2/g$, the BET specific surface area being preferably determined as defined in Reference Example 1.

3. The catalyst of embodiment 1, wherein the first non-zeolitic oxidic material further comprises one or more of zirconium, silicon and titanium, preferably one or more of zirconium and silicon, more preferably silicon, wherein the first non-zeolitic material more preferably comprises aluminum and silicon.

4. The catalyst of embodiment 3, wherein from 98 to 100 weight-%, preferably from 99 to 100 weight-%, more preferably from 99.5 to 100 weight-%, of the first non-zeolitic oxidic material consist of aluminum, silicon and oxygen; wherein preferably from 90 to 99 weight %, more preferably from 92 to 96 weight-%, of the first non-zeolitic oxidic material consist of aluminum, calculated as $Al_2O_3$, and wherein preferably from 1 to 10 weight-%, more preferably from 4 to 8 weight-%, of the first non-zeolitic oxidic material consist of silicon, calculated as $SiO_2$;

wherein the first non-zeolitic material more preferably has a BET specific surface area in the range of from 50 to 180 $m^2/g$, more preferably in the range of from 70 to 160 $m^2/g$, more preferably in the range of from 80 to 110 $m^2/g$, the BET specific surface area being preferably determined as defined in Reference Example 1.

5. The catalyst of any one of embodiments 1 to 4, wherein the first non-zeolitic oxidic material is comprised in the coating (ii) in an amount in the range of from 2 to 28 weight-%, preferably in the range of from 5 to 25 weight-%, more preferably in the range of from 6 to 18 weight-%, more preferably in the range of from 7 to 17 weight-%, more preferably in the range of from 8 to 15 weight-%, more preferably in the range of from 9 to 13 weight-%, based on the weight of the 8-membered ring pore zeolitic material.

6. The catalyst of any one of embodiments 1 to 5, wherein the second non-zeolitic oxidic material comprised in the coating (ii) comprises a mixed oxide of cerium and one or more of zirconium, aluminum, silicon, lanthanum, niobium, iron, manganese, titanium, tungsten, copper, molybdenum, neodymium, cobalt, chromium, tin and praseodymium, or a mixture of a cerium oxide and an oxide of one or more of zirconium, aluminum, silicon, lanthanum, niobium, iron, manganese, titanium, tungsten, copper, molybdenum, neodymium, cobalt, chromium, tin and praseodymium.

7. The catalyst of embodiment 6, wherein the second non-zeolitic oxidic material comprised in the coating (ii) comprises a mixed oxide of cerium and one or more of zirconium, aluminum, silicon, lanthanum, niobium, iron, manganese, titanium, tungsten, copper, molybdenum, neodymium, cobalt, chromium, tin and praseodymium, preferably a mixed oxide of cerium and one or more of zirconium, aluminum and silicon, more preferably a mixed oxide of cerium and zirconium.

8. The catalyst of embodiment 7, wherein the mixed oxide of cerium and zirconium has a crystalline phase $Ce_aZr_{1-a}O_2$, wherein a is in the range of from 0.1 to 0.9, preferably in the range of from 0.2 to 0.8, more preferably in the range of from 0.25 to 0.75.

9. The catalyst of embodiment 7 or 8, wherein the second non-zeolitic oxidic material comprised in the coating (ii) additionally comprises an oxide of one or more of lanthanum, niobium, iron, manganese, titanium, tungsten, copper, molybdenum, neodymium, cobalt, chromium, tin and praseodymium, preferably an oxide of one or more of lanthanum and niobium, more preferably an oxide of lanthanum or more preferably an oxide of niobium;

wherein the oxide of one or more of lanthanum, niobium, iron, manganese, titanium, tungsten, copper, molybdenum, neodymium, cobalt, chromium, tin and praseodymium preferably is supported on the mixed oxide.

10. The catalyst of embodiment 9, wherein the oxide of one or more of lanthanum, niobium, iron, manganese, titanium, tungsten, copper, molybdenum, neodymium, cobalt, chromium, tin and praseodymium is comprised in the second non-zeolitic oxidic material comprised in the coating (ii) in an amount in the range of from 2 to 25 weight-%, preferably in the range of from 3 to 20 weight-%, more preferably in an amount of 4 to 16 weight-%, based on the weight of the mixed oxide.

11. The catalyst of embodiment 9 or 10, wherein the second non-zeolitic oxidic material comprises, preferably consists of, the oxide of one or more of lanthanum and niobium, preferably the oxide of lanthanum or niobium, and a mixed oxide of cerium and one or more of zirconium, aluminum and silicon, more preferably a mixed oxide of cerium and zirconium, wherein the lanthanum or the niobium oxide preferably is supported on the mixed oxide of cerium and zirconium.

12. The catalyst of any one of embodiments 7 to 11, wherein from 98 to 100 weight-%, preferably from 99 to 100 weight-%, more preferably from 99.5 to 100 weight-%, of the second non-zeolitic oxidic material consist of a mixed oxide of cerium and one or more of zirconium, aluminum, silicon, lanthanum, niobium, iron, manganese, titanium, tungsten, copper, molybdenum, neodymium, cobalt, chromium, tin and praseodymium, and preferably an oxide as defined in embodiment 9 or 10.

13. The catalyst of embodiment 6, wherein the second non-zeolitic oxidic material comprised in the coating (ii) comprises a mixture of a cerium oxide and one or more of a zirconium oxide, an aluminum oxide, a silicon oxide, a lanthanum oxide, a niobium oxide, an iron oxide, a manganese oxide, a titanium oxide, a tungsten oxide, a copper oxide, a molybdenum oxide, a neodymium oxide, a cobalt oxide, a chromium oxide, a tin oxide and a praseodymium oxide, preferably a mixture of a cerium oxide and one or more of a zirconium oxide, an aluminum oxide, a silicon oxide, a lanthanum oxide and a niobium oxide, more preferably a mixture of a cerium oxide and one or more of an aluminum oxide, a lanthanum oxide and a niobium oxide, more preferably a mixture of a cerium oxide, an aluminum oxide and a lanthanum oxide or more preferably a mixture of a cerium oxide, an aluminum oxide and a niobium oxide.

14. The catalyst of embodiment 13, wherein from 98 to 100 weight-%, preferably from 99 to 100 weight-%, more preferably from 99.5 to 100 weight-%, of the second non-zeolitic oxidic material comprised in the coating (ii) consist of a mixture of a cerium oxide, an aluminum oxide and a lanthanum oxide, wherein preferably from 2 to 20 weight-%, more preferably from 5 to 15 weight-%, of the second non-zeolitic material consist of lanthanum, calculated as $La_2O_3$.

15. The catalyst of embodiment 13, wherein from 98 to 100 weight-%, preferably from 99 to 100 weight-%, more preferably from 99.5 to 100 weight-%, of the second non-zeolitic oxidic material comprised in the coating (ii) consist of a mixture of a cerium oxide, an aluminum oxide and a niobium oxide, wherein preferably from 2 to 20 weight-%, more preferably from 5 to 15 weight-%, of the second non-zeolitic material consist of niobium, calculated as $Nb_2O_5$.

16. The catalyst of any one of embodiments 1 to 15, wherein the second non-zeolitic oxidic material has a BET specific surface area in the range of from 50 to 700 $m^2/g$, preferably in the range of from 60 to 600 $m^2/g$, more preferably in the range of from 70 to 580 $m^2/g$, determined as described in Reference Example 1.

17. The catalyst of any one of embodiments 1 to 16, wherein the second non-zeolitic oxidic material is comprised in the coating (ii) in an amount in the range of from 15 to 35 weight %, preferably in the range of from 16 to 30 weight-%, more preferably in the range of from 17 to 25 weight-%, based on the weight of the 8-membered ring pore zeolitic material.

18. The catalyst of embodiment 17, wherein the second non-zeolitic oxidic material is comprised in the coating (ii) in an amount in the range of from 18 to 23 weight-%, based on the weight of the 8-membered ring pore zeolitic material.

19. The catalyst of any one of embodiments 1 to 18, wherein the ratio of the weight of the first non-zeolitic oxidic material, (w1), to the weight of the second non-zeolitic oxidic material, (w2), defined as (w1):(w2), is in the range of from 0.2:1 to 0.7:1, preferably in the range of from 0.3:1 to 0.6:1, more preferably in the range of from 0.4:1 to 0.55:1, more preferably in the range of from 0.45:1 to 0.55:1.

20. The catalyst of any one of embodiments 1 to 19, wherein the 8-membered ring pore zeolitic material comprised in the coating (ii) has a framework type selected from the group consisting of CHA, AEI, RTH, LEV, DDR, KFI, ERI, AFX, LTA, a mixture of two or more thereof and a mixed type of two or more thereof, preferably selected from the group consisting of CHA, AEI, RTH, a mixture of two or more thereof and a mixed type of two or more thereof, more preferably selected from the group consisting of CHA and AEI, wherein more preferably the 8-membered ring pore zeolitic material comprised in the coating (ii) has a framework type CHA.

21. The catalyst of any one of embodiments 1 to 20, wherein the zeolitic material comprised in the coating (ii) comprises copper, wherein the amount of copper in the zeolitic material, calculated as CuO, preferably is in the range of from 0.1 to 10 weight-%, more preferably in the range of from 1.5 to 5.5 weight-%, more preferably in the range of from 2.5 to 5.0 weight-%, more preferably in the range of from 3.0 to 4.75 weight-%, more preferably in the range of from 3.25 to 4.5 weight-%, based on the weight of the zeolitic material.

22. The catalyst of embodiment 22, wherein the amount of iron comprised in the zeolitic material, calculated as $Fe_2O_3$, is in the range of from 0 to 0.01 weight-%, preferably in the range of from 0 to 0.001 weight-%, more preferably in the range of from 0 to 0.0001 weight-%, based on the weight of the zeolitic material.

23. The catalyst of any one of embodiments 1 to 22, wherein from 95 to 100 weight-%, preferably from 98 to 100 weight-%, more preferably from 99 to 100 weight-%, more preferably from 99.5 to 100 weight-%, of the framework structure of the zeolitic material consist of Si, Al, O, and optionally H, wherein in the framework structure, the molar ratio of Si to Al, calculated as molar $SiO_2:Al_2O_3$, preferably is in the range of from 2:1 to 50:1, more preferably in the range of from 5:1 to 45:1, more preferably in the range of from 10:1 to 40:1, more preferably in the range of from 13:1 to 30:1, more preferably in the range of from 14:1 to 27:1, more preferably in the range of from 15:1 to 26:1, more preferably in the range of from 15:1 to 20:1 or more preferably in the range of from 22:1 to 26:1.

24. The catalyst of any one of embodiments 1 to 20, wherein the zeolitic material comprised in the coating (ii) comprises iron, wherein the amount of iron comprised in the zeolitic material, calculated as $Fe_2O_3$, preferably is in the range of from 0.1 to 10.0 weight-%, more preferably in the range of from 0.5 to 7.0 weight-%, more preferably in the range of from 1.0 to 5.5 weight-%, more preferably in the range of from 2.0 to 5.5 weight-%, based on the weight of the zeolitic material, and wherein preferably from 95 to 100 weight-%, more preferably from 98 to 100 weight-%, more preferably from 99 to 100 weight-%, more preferably from 99.5 to 100 weight-%, of the framework structure of the zeolitic material consist of Si, Al, O, and optionally H, wherein in the framework structure, the molar ratio of Si to Al, calculated as molar $SiO_2$:$Al_2O_3$, preferably is in the range of from 2:1 to 50:1, more preferably in the range of from 5:1 to 45:1, more preferably in the range of from 10:1 to 40:1, more preferably in the range of from 13:1 to 30:1, more preferably in the range of from 14:1 to 27:1, more preferably in the range of from 15:1 to 26:1, more preferably in the range of from 15:1 to 20:1 or more preferably in the range of from 22:1 to 26:1.

25. The catalyst of any one of embodiments 1 to 24, wherein the 8-membered ring pore zeolitic material comprised in the coating (ii), preferably having a framework type CHA, comprises crystals having an average crystal size in the range of from 0.05 to 5 micrometers, preferably in the range of from 0.06 to 2 micrometers, more preferably in the range of from 0.07 to 1 micrometer, more preferably in the range of from 0.1 to 0.8 micrometer, more preferably in the range of from 0.2 to 0.6 micrometer, the average crystal size being preferably determined as in Reference Example 8.

26. The catalyst of any one of embodiments 1 to 25, wherein the 8-membered ring pore zeolitic material comprised in the coating (ii), preferably having a framework type CHA, has a BET specific surface area in the range of from 50 to 900 $m^2/g$, preferably in the range of from 150 to 700 $m^2/g$, more preferably in the range of from 250 to 650 $m^2/g$, determined as described in Reference Example 1.

27. The catalyst of any one of embodiments 1 to 26, wherein from 65 to 80 weight-%, preferably from 70 to 78 weight-%, more preferably from 72 to 76 weight-%, of the coating (ii) consist of the 8-membered ring pore zeolitic material comprising one or more of copper and iron.

28. The catalyst of any one of embodiments 1 to 27, wherein the 8-membered ring pore zeolitic material is comprised in the coating (ii) at a loading in the range of from 0.5 to 5 $g/in^3$, preferably in the range of from 0.75 to 4 $g/in^3$, more preferably in the range of from 1 to 3 $g/in^3$.

29. The catalyst of any one embodiments 1 to 28, wherein the coating (ii) further comprises an oxidic binder, wherein the oxidic binder preferably comprises one or more of zirconia, alumina, titania, silica, and a mixed oxide comprising two or more of Zr, Al, Ti, and Si, more preferably comprises one or more of silica, alumina and zirconia, more preferably comprises one or more of alumina and zirconia, more preferably zirconia.

30. The catalyst of embodiment 29, wherein the oxidic binder, preferably zirconia, is comprised in the coating (ii) in an amount in the range of from 0.1 to 8 weight-%, preferably in the range of from 1 to 7 weight-%, more preferably in the range of from 2 to 6.5 weight-%, more preferably in the range of from 3 to 6 weight-%, more preferably in the range of from 4 to 5.5 weight-%, based on the weight of the 8-membered ring pore zeolitic material.

31. The catalyst of any one of embodiments 1 to 30, wherein the loading of the coating (ii) is in the range of from 1 to 5 $g/in^3$, preferably in the range of from 1.5 to 3 $g/in^3$, more preferably in the range of from 1.75 to 2.5 $g/in^3$.

32. The catalyst of any one of embodiments 1 to 31, wherein the coating (ii) extends over x % of the substrate axial length, preferably from the inlet end to the outlet end of the substrate, wherein x is in the range of from 80 to 100, preferably in the range of from 90 to 100, more preferably in the range of from 95 to 100, more preferably in the range of from 98 to 100.

33. The catalyst of any one of embodiments 1 to 32, wherein from 98 to 100 weight-%, preferably from 99 to 100 weight-%, more from 99.5 to 100 weight-%, of the coating (ii) consist of the first non-zeolitic oxidic material comprising aluminum, the second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, the 8-membered ring pore zeolitic material comprising one or more of copper and iron, and preferably the oxidic binder as defined in embodiment 29 or 30.

34. The catalyst of any one of embodiments 1 to 33, wherein the coating (ii) is disposed on the surface of the internal walls of the substrate, which surface defines the interface between the internal walls and the passages, and/or within the internal walls of the substrate.

35. The catalyst of any one of embodiments 1 to 34, wherein the substrate is a wall-flow filter substrate or a flow-through substrate, preferably a wall-flow filter substrate, wherein the plurality of passages preferably comprise inlet passages having an open inlet end and a closed outlet end, and outlet passages having a closed inlet end and an open outlet end.

36. The catalyst of embodiment 35, wherein the wall-flow filter substrate is a porous wall-flow filter substrate, wherein the wall-flow filter substrate preferably is one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate;

wherein the coating (ii) preferably is disposed within the internal walls of the porous wall flow filter.

37. The catalyst of any one of embodiments 1 to 36, consisting of the substrate (i) and the coating (ii).

38. A process for preparing a selective catalytic reduction catalyst for the treatment of an exhaust gas of a combustion engine, preferably the selective catalytic reduction catalyst according to any one of embodiments 1 to 37, the process comprising (a) preparing a mixture comprising water, a first non-zeolitic oxidic material comprising aluminum, a second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, and an 8-membered ring pore zeolitic material comprising one or more of copper and iron;

(b) disposing the mixture obtained according to (a) on a substrate, the substrate comprising an inlet end, an outlet end, a substrate axial length extending from the inlet end to the outlet end and a plurality of passages defined by internal walls of the substrate extending therethrough, obtaining a mixture-treated substrate;

(c) calcining the mixture-treated substrate obtained according to (b), obtaining the substrate having a coating disposed thereon, wherein at least 65 weight-% of the coating consist of the 8-membered ring pore zeolitic material comprising one or more of copper and iron.

39. The process of embodiment 38, wherein (a) comprises, preferably consists of, (a.1) preparing a first aqueous mixture comprising an 8-membered ring pore zeolitic material and one or more of a copper salt and an iron salt, preferably a copper salt; or preparing a first aqueous mixture comprising an 8-membered ring pore zeolitic material comprising copper and one or more of a copper salt and an iron salt, preferably a copper salt;

calcining of the obtained first aqueous mixture, preferably in a gas atmosphere having a temperature in the range of from 300 to 700° C., the gas atmosphere preferably being air, obtaining the 8-membered ring pore zeolitic material comprising one or more of copper and iron, preferably copper;

(a.2) preparing a second aqueous mixture comprising water and a first non-zeolitic oxidic material comprising aluminum;

impregnating the second aqueous mixture on the 8-membered ring pore zeolitic material comprising one or more of copper and iron obtained according to (a.1);

calcining, preferably in a gas atmosphere having a temperature in the range of from 300 to 700° C., the gas atmosphere preferably being air, obtaining the first non-zeolitic oxidic material comprising aluminum with the 8-membered ring pore zeolitic material comprising one or more of copper and iron, preferably copper;

(a.3) preparing a third aqueous mixture comprising water, the first non-zeolitic oxidic material comprising aluminum with the 8-membered ring pore zeolitic material comprising one or more of copper and iron obtained according to (a.2), and preferably a precursor of an oxidic binder;

(a.4) preferably milling the third aqueous mixture obtained according to (a.3), more preferably until the particles of said mixture have a Dv90 in the range of from 1 to 10 micrometers, more preferably in the range of from 2 to 7 micrometers, more preferably in the range of from 3 to 5 micrometers, the Dv90 being preferably determined as described in Reference Example 3;

(a.5) preparing a fourth aqueous mixture comprising water, the second non-zeolitic oxidic material, and preferably an acid, more preferably an organic acid;

(a.6) admixing the third aqueous mixture obtained according to (a.3), preferably to (a.4), and the fourth aqueous mixture obtained according to (a.5).

40. The process of embodiment 39, wherein calcining in (a.1) is performed in a gas atmosphere having a temperature in the range of from 400 to 600° C., preferably in the range of from 450 to 550° C., wherein calcining preferably is performed for a duration in the range of from 0.5 to 4 hours, more preferably in the range of from 1 to 3 hours.

41. The process of embodiment 39 or 40, wherein calcining in (a.2) is performed in a gas atmosphere having a temperature in the range of from 400 to 600° C., preferably in the range of from 450 to 550° C., wherein calcining preferably is performed for a duration in the range of from 0.5 to 4 hours, more preferably in the range of from 1 to 3 hours.

42. The process of any one of embodiments 39 to 41, wherein the precursor of an oxidic binder comprised in the third aqueous mixture is one or more of an aluminum salt, a silicon salt, a zirconium salt, and a titanium salt, preferably one or more of a zirconium salt, and an aluminum salt, more preferably a zirconium salt, more preferably zirconium acetate.

43. The process of any one of embodiments 39 to 42, wherein the third aqueous mixture prepared according to (a.3) further comprises an acid, preferably an organic acid, wherein the organic acid more preferably is one or more of a tartaric acid, an acetic acid, a citric acid, a nitric acid, a hydrochloric acid and a sulfuric acid, wherein the organic acid more preferably is an acetic acid.

44. The process of any one of embodiments 39 to 43, wherein the organic acid comprised in the fourth aqueous mixture prepared according to (a.5) is one or more of a tartaric acid, an acetic acid, a citric acid, a nitric acid, a hydrochloric acid and a sulfuric acid.

45. The process of embodiment 38, wherein (a) comprises, preferably consists of, (a.1') preparing a first aqueous mixture comprising an 8-membered ring pore zeolitic material comprising copper and one or more of a copper oxide and an iron oxide, preferably a copper oxide;

(a.2') preparing a second aqueous mixture comprising water, a first non-zeolitic oxidic material comprising aluminum, and preferably an acid, more preferably an organic acid;

(a.3') admixing the first aqueous mixture obtained according to (a.1') and the second aqueous mixture obtained according to (a.2'), obtaining a third aqueous mixture;

(a.4') preparing a fourth aqueous mixture comprising water, the second non-zeolitic oxidic material, and preferably an acid, more preferably an organic acid;

(a.5') admixing the third aqueous mixture obtained according to (a.3') and the fourth aqueous mixture obtained according to (a.4').

46. The process of embodiment 45, wherein (a.1') comprises, preferably consists of, (a.1'.1) preparing a mixture comprising water and the one or more of a copper oxide and an iron oxide, preferably a copper oxide, more preferably CuO;

(a.1'.2) preferably milling the mixture prepared according to (a.1'.1), more preferably until the particles of said mixture have a Dv90 in the range of from 3 to 20 micrometers, more preferably in the range of from 6 to 10 micrometers, the Dv90 being preferably determined as described in Reference Example 3;

(a.1'.3) preferably adding a precursor of an oxidic binder in the mixture obtained according to (a.1'.1), preferably (a.1'.2), wherein the precursor of an oxidic binder preferably is as defined in embodiment 39;

(a.1'.4) preparing a mixture comprising water and a 8-membered ring pore zeolitic material comprising copper;

(a.1'.5) admixing the mixture prepared according to (a.1'.4) with the mixture prepared according to (a.1'.1), preferably to (a.1'.2) and preferably to (a.1'.3).

47. The process of embodiment 45 or 46, wherein the organic acid comprised in the second aqueous mixture prepared according to (a.2') is one or more of a tartaric acid, an acetic acid, a citric acid, a nitric acid, a hydrochloric acid and a sulfuric acid.

48. The process of any one of embodiments 45 to 47, wherein the organic acid comprised in the second aqueous mixture prepared according to (a.4') is one or more of a tartaric acid, an acetic acid, a citric acid, a nitric acid, a hydrochloric acid and a sulfuric acid.

49. The process of any one of embodiments 38 to 48, wherein the first non-zeolitic oxidic material is as defined in any one of embodiments 2 to 5.

50. The process of any one of embodiments 38 to 49, wherein the second non-zeolitic oxidic material is as defined in any one of embodiments 6 to 18.

51. The process of any one of embodiments 38 to 50, wherein disposing the mixture obtained according to (a) on the substrate according to (b) is performed by dipping the substrate in the mixture obtained according to (a).

52. The process of any one of embodiments 38 to 51, wherein according to (b), the mixture prepared according to (a) is disposed on the substrate over x % of the substrate axial length, wherein x is in the range of from 80 to 100, preferably in the range of from 90 to 100, more preferably in the range of from 95 to 100, more preferably in the range of from 98 to 100.

53. The process of any one of embodiments 38 to 52, wherein the mixture prepared according to (a) is disposed on the substrate from the inlet end to the outlet end of the substrate.

54. The process of any one of embodiments 38 to 53, wherein (b) further comprises after disposing the mixture obtained in (a) on the substrate, drying the mixture-treated substrate, preferably in a gas atmosphere having a temperature in the range of from 50 to 300° C., more preferably in the range of from 60 to 190° C., the gas atmosphere preferably being air.

55. The process of embodiment 54, wherein drying is performed for a duration in the range of from 0.1 to 240 minutes, preferably in the range of from 0.15 to 120 minutes.

56. The process of any one of embodiments 38 to 55, wherein (b) further comprising (b.1) disposing a first portion of the mixture obtained in (a) on a substrate comprising an inlet end, an outlet end, a substrate axial length extending from the inlet end to the outlet end and a plurality of passages defined by internal walls of the substrate extending therethrough, the disposing preferably being from the inlet end toward the outlet end of the substrate; and drying the substrate comprising the first portion of the mixture disposed thereon;

(b.2) disposing a second portion of the mixture obtained in (i) on the substrate comprising the first portion of the mixture disposed thereon obtained in (b.2), the disposing preferably being from the inlet end toward the outlet end of the substrate; and preferably drying the substrate comprising the first and the second portion of the mixture disposed thereon.

57. The process of any one of embodiments 38 to 56, wherein calcining according to (c) is performed in a gas atmosphere having a temperature in the range of from 300 to 800° C., preferably in the range of from 350 to 700° C., the gas atmosphere preferably being air.

58. The process of any one of embodiments 38 to 57, wherein calcining according to (c) is performed in a gas atmosphere for a duration in the range of from 10 to 240 minutes, preferably in the range of from 20 to 160 minutes, the gas atmosphere preferably being air.

59. The process of any one of embodiments 38 to 58, consisting of (a), (b), (c) and (d).

60. A selective catalytic reduction catalyst, preferably a selective catalytic reduction catalyst according to any one of embodiments 1 to 37, obtained or obtainable by a process according to any one of embodiments 38 to 59.

61. Use of a selective catalytic reduction catalyst according to any one of embodiments 1 to 37 and 60 for the selective catalytic reduction of nitrogen oxide.

62. A method for the selective catalytic reduction of nitrogen oxide, the method comprising (1) providing the exhaust gas stream, preferably from a combustion engine, more preferably a diesel engine;

(2) passing the exhaust gas stream provided in (1) through a selective catalytic reduction catalyst according to any one of embodiments 1 to 37 and 60.

63. An exhaust gas treatment system for treating an exhaust gas stream exiting a combustion engine, preferably a diesel engine, said exhaust gas treatment system having an upstream end for introducing said exhaust gas stream into said exhaust gas treatment system, wherein said exhaust gas treatment system comprises a first selective catalytic reduction catalyst according to any one of embodiments 1 to 37 and 60, and one or more of a diesel oxidation catalyst, a second selective catalytic reduction catalyst, an ammonia oxidation catalyst, a diesel oxidation catalyst containing a $NO_X$ storage function and a particulate filter.

In the context of the present invention, the term "based on the weight of the zeolitic material" refers to the weight of the zeolitic material alone, meaning without copper.

Further, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Further, in the context of the present invention, the term "combustion engine" preferably relates to a diesel engine.

Furthermore, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the expression "coating disposed on the substrate" means that the coating is preferably disposed on the surface of the internal walls of the substrate, which surface defines the interface between the internal walls and the passages, and/or within the internal walls of the substrate.

Furthermore, in the context of the present invention, the term "consists of" with regard to the weight-% of one or more components indicates the weight-% amount of said component(s) based on 100 weight-% of the entity in question. For example, the wording "wherein from 0 to 0.0001 weight-% of the coating consists of platinum" indicates that among the 100 weight-% of the components of which said coating consists of, 0 to 0.0001 weight-% is platinum.

The present invention is further illustrated by the following Reference Examples, Comparative Examples, and Examples.

EXAMPLES

Reference Example 1 Measurement of the BET Specific Surface Area

The BET specific surface area was determined according to DIN 66131 or DIN-ISO 9277 using liquid nitrogen.

Reference Example 2 Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 3 Determination of the Volume-Based Particle Size Distributions The particle size distributions were determined by a static light scattering method using Sympatec HELOS (3200) & QUIXEL equipment, wherein the optical concentration of the sample was in the range of from 6 to 10%.

Reference Example 4: Cu-Chabazite Prepared According to Usual Liquid Phase Ion-exchange (LPIE) Process The zeolitic materials having the framework structure type CHA comprising Cu and used in some of the examples herein were prepared essentially as disclosed in U.S. Pat. No. 8,293,199 B2. Particular reference is made to Inventive Example 2 of U.S. Pat. No. 8,293,199 B2, column 15, lines 26 to 52.

Comparative Example 1: Process for Preparing a Selective Catalytic Reduction Catalyst Comprising a Zeolitic Material Comprising Copper not According to the Present Invention Slurry 1:

A CuO powder having a Dv50 of 33 micrometers was added to water. The amount of CuO was calculated such that the total amount of copper, calculated as CuO, in the coating after calcination was 4.15 weight-% based on the weight of the Chabazite. The resulting mixture was milled using a continuous milling apparatus so that the Dv50 value of the particles was about 2 micrometers and the Dv90 value of the particles was about 5 micrometers. The resulting slurry had a solid content of 8 weight-% based on the weight of said slurry. Acetic acid and an aqueous zirconium acetate solution was added to the CuO-containing mixture forming a slurry. The amount of acetic acid was calculated to be 1.7 weight-% of the Chabazite and the amount of zirconium acetate was calculated such that the amount of zirconia in the coating, calculated as $ZrO_2$, was 5 weight-% based on the weight of the Chabazite. Separately, a Chabazite (Dv50 of 2.2 micrometers, a $SiO_2$:$Al_2O_3$ of 18, an average crystal size of 0.4 micrometer (SEM analysis) was added to water to form a mixture having a solid content of 36 weight-% based on the weight of said mixture. The Cu-Chabazite mixture was mixed to the copper containing slurry. The amount of the Cu-Chabazite was calculated such that the loading of Chabazite after calcination was 84% of the loading of the coating in the catalyst after calcination. The resulting slurry was milled using a continuous milling apparatus so that the Dv90 value of the particles was of about 4.5 micrometers.

Slurry 2:

Separately, an aqueous slurry having a solid content of 12 weight-% based on the weight of said slurry and comprising water and alumina ($Al_2O_3$ 95 weight-% with $SiO_2$ 5 weight-% having a BET specific surface area of about 180 $m^2$/g, a Dv90 of about 5 micrometers) was prepared. The amount of alumina+silica was calculated such that the amount of alumina+silica after calcination was 10 weight-% based on the weight of the Chabazite.

Subsequently, slurries 1 and 2 were combined, the solid content of the obtained final slurry was of about 31 weight-% based on the total weight of said final slurry.

A porous uncoated wall-flow filter substrate, silicon carbide, (an average porosity of 60.5%, a mean pore size of 20 micrometers and 350 CPSI and 0.33 mm (13 mil) wall thickness, diameter: 1.5 inch (38.1 mm)*length: 6 inches (152.4 mm)) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 130° C. for 30 minutes and calcined at 450° C. for 2 hours. This was repeated once. The final coating loading after calcinations was about 2 g/$in^3$, including about 1.68 g/$in^3$ of CHA zeolitic material, 0.17 g/$in^3$ of alumina+silica, about 0.084 g/$in^3$ of zirconia and 4.15 weight-% of Cu, calculated as CuO, based on the weight of the CHA zeolitic material.

Reference Example 5: Process for Preparing a Selective Catalytic Reduction Catalyst Comprising a Zeolitic Material Comprising Copper not According to the Present Invention In a first step, a zeolitic material having a framework type CHA (Dv50 of 5 micrometers, a $SiO_2$:$Al_2O_3$ of 18, an average crystal size of about 0.4 micrometer (SEM analysis), and a pore volume of 1 m/g was added to an aqueous solution of copper acetate (3.51 weight-% of Cu, calculated as CuO). The aqueous copper acetate solution is provided in a quantity sufficient to fill the pores of the CHA zeolitic material by incipient wetness impregnation to obtain a Cu content, calculated as CuO, of about 4.15 weight-%. After the impregnation, the Cu-containing zeolitic material was calcined in air for 2 hours at 500° C.

In a second step, an alumina sol (a solid content 22-25 weight-%, a Dv50 of about 90 nm in the alumina sol) was dispersed in water and impregnated on the calcined Cu-zeolitic material so that the weight percent of the alumina after calcination amounts to 10 weight-% based on the weight of the zeolitic material. After the impregnation, the Cu-zeolitic material+alumina was calcined in air for 2 hours at 500° C. Subsequently, the calcined Cu-zeolite+alumina was dispersed in water and an aqueous zirconium acetate solution, forming a slurry. The amount of zirconium acetate was calculated such that the amount of zirconia in the coating, calculated as $ZrO_2$, was 5 weight-% based on the weight of the zeolitic material. Finally, acetic acid (1.7 weight-% based on the weight of the zeolitic material) was added to said slurry. The resulting slurry was milled using a continuous milling apparatus so that the Dv90 value of the particles was of about 4 micrometers and the solid content of the obtained slurry was adjusted to 31 weight-% based on the weight of said slurry.

The obtained slurry was coated twice on a porous uncoated wall-flow filter substrate, silicon carbide, (an average porosity of 60.5%, a mean pore size of 20 micrometers and 350 CPSI and 0.33 mm (13 mil) wall thickness, diameter: 1.5 inch (38.1 mm)*length: 6 inches (152.4 mm)) according to the process described in Comparative Example 1 in the foregoing. The final coating loading after calcinations was about 2.1 g/in$^3$, including about 1.73 g/in$^3$ of CHA zeolitic material, 0.173 g/in$^3$ of alumina+silica, about 0.0865 g/in$^3$ of zirconia and 4.15 weight-% of Cu, calculated as CuO, based on the weight of the CHA zeolitic material.

Example 1: Preparation of a Selective Catalytic Reduction Catalyst Comprising a Zeolitic Material Comprising Copper, a First Oxidic Material and a Second Oxidic Material According to the Present Invention For preparing the catalyst of Example 1, the first and second steps of Reference Example 5 were repeated. Thus, the Dv90 value of the particles of the obtained slurry comprising the calcined Cu-zeolitic material+alumina was of about 4 micrometers and the solid content of the obtained slurry was adjusted to 31 weight-% as in Reference Example 5.

Separately, a cerium-zirconium mixed oxide (Ce content, calculated as $CeO_2$, of about 70 weight-% based on the total weight of the mixed oxide and Zr content, calculated as $ZrO_2$, of about 30 weight-% based on the total weight of the mixed oxide, a BET specific surface area of 222 m$^2$/g, a Dv50 of 19.2 micrometers) was added to a lanthanum nitrate solution (13 weight-% of lanthanum, calculated as $La_2O_3$) in a quantity sufficient to fill the pores of the mixed oxide (incipient wetness impregnation) to obtain a La content, calculated as $La_2O_3$, of 10 weight-% based on the weight of the mixed oxide. After the impregnation, the La+Ce—Zr mixed oxide was calcined in air for 2 hours at 590° C. The calcined La doped Ce—Zr oxide was dispersed in water.

Subsequently, the calcined Cu-zeolitic material+alumina obtained from the second step of Reference Example 5 (Dv90 of about 4 micrometers) was added to the La+Ce—Zr oxide slurry such that the amount of Ce—Zr oxide is of 20 weight-% based on the weight of the zeolitic material. The solid content of the obtained slurry is adjusted to 31 weight-% based on the weight of said slurry.

The obtained slurry was coated twice on a porous uncoated wall-flow filter substrate, silicon carbide, (an average porosity of 60.5%, a mean pore size of 20 micrometers and 350 CPSI and 0.33 mm (13 mil) wall thickness, diameter: 1.5 inch (38.1 mm)*length: 6 inches (152.4 mm)) according to the process described in Comparative Example 1 in the foregoing. The final coating loading after calcinations was about 2.1 g/in$^3$, including about 1.48 g/in$^3$ of CHA zeolitic material, 0.148 g/in$^3$ of alumina, 0.32 g/in$^3$ of La doped Ce—Zr oxide, about 0.074 g/in$^3$ of zirconia and 4.15 weight-% of Cu, calculated as CuO, based on the weight of the CHA zeolitic material.

Example 2: Preparation of a Selective Catalytic Reduction Catalyst Comprising a Zeolitic Material Comprising Copper, a First Oxidic Material and a Second Oxidic Material According to the Present Invention The catalyst of Example 2 was prepared as the catalyst of Example 1 except that a cerium-zirconium mixed oxide (Ce content, calculated as $CeO_2$, of about 58 weight-% based on the total weight of the mixed oxide and Zr content, calculated as $ZrO_2$, of about 42 weight-% based on the total weight of the mixed oxide, a BET specific surface area of 116 m$^2$/g, a Dv50 of 13.5 micrometers) was replacing the mixed oxide of Ce—Zr used in Example 1.

Example 3: Preparation of a Selective Catalytic Reduction Catalyst Comprising a Zeolitic Material Comprising Copper, a First Oxidic Material and a Second Oxidic Material According to the Present Invention The catalyst of Example 2 was prepared as the catalyst of Example 1 except that a cerium-zirconium mixed oxide (Ce content, calculated as $CeO_2$, of about 30 weight-% based on the total weight of the mixed oxide and Zr content, calculated as $ZrO_2$, of about 70 weight-% based on the total weight of the mixed oxide, a BET specific surface area of 85 m$^2$/g, a Dv50 of 10 micrometers) was replacing the mixed oxide of Ce—Zr used in Example 1.

A recapitulative table is provided in the following.

TABLE 1

| | Zeolitic material | Ion-exchange method | 1$^{st}$ oxidic material | wt.-%* | 2$^{nd}$ oxidic material | wt.-%* | Final washcoat loading (g/in$^3$) |
|---|---|---|---|---|---|---|---|
| Comp. Ex. 1 | Cu-CHA (SAR:18) | ISIE[a] | silica-alumina | 10 | — | — | 2.0 |
| Ref. Ex. 5 | Cu-CHA (SAR:18) | Impregnation Cu acetate | alumina sol | 10 | — | — | 2.1 |
| Ex. 1 | Cu-CHA (SAR:18) | Impregnation Cu acetate | alumina sol | 10 | La (10 wt.-%) $Ce_{0.7}Zr_{0.3}O_x$ | 22 | 2.1 |
| Ex. 2 | Cu-CHA (SAR:18) | Impregnation Cu acetate | alumina sol | 10 | La (10 wt.-%) $Ce_{0.58}Zr_{0.42}O_x$ | 22 | 2.1 |

TABLE 1-continued

| | Zeolitic | Ion-exchange | $1^{st}$ oxidic material | | $2^{nd}$ oxidic material | | Final washcoat loading |
|---|---|---|---|---|---|---|---|
| | material | method | | wt.-%* | | wt.-%* | (g/in$^3$) |
| Ex. 3 | Cu-CHA (SAR:18) | Impregnation Cu acetate | alumina sol | 10 | La (10 wt.-%) $Ce_{0.3}Zr_{0.7}O_x$ | 22 | 2.1 |

[a]ISIE, In-situ ion-exchange of a zeolitic material which is not pre-exchanged.
*based on the weight of the zeolitic material.
SAR: silica to alumina molar ratio.

Analytics

XRD was done on the La—Ce—Zr oxides from Examples 1-3 after impregnation of La and calcination: no $CeO_x$ or $LaO_x$ phases were found but only the Ce—Zr mixed oxide phases (see FIG. 7). Thus, the obtained oxide is a mixed oxide of cerium and zirconium having La oxide ($La_2O_3$) thereon.

Example 4: Testing of the Catalysts of Comparative Example 1, Reference Example 5 and Examples 1 to 3—NOx Conversion and Backpressure 4.1 NOx Conversion The catalysts were aged in an oven at 800° C. hydrothermally (20% $O_2$, 10% $H_2O$ in % $N_2$) for 16 hours. The NOx conversion of the aged catalysts at 20 ppm ammonia slip was measured on a reactor equipped with two FTIR's (Fourier-Transform Infrared Spectrometer) in which 1.5 inch cores can be measured. The measurements were done at 200° C., at a space velocity of 40 k/h (500 ppm NO, $NH_3/NO_X$=1.5, 5% CO2, 5% $H_2O$, 80 ppm $C_3H_6$). The results are displayed on

FIG. 1.

As may be taken from FIG. 1, the catalysts according to Examples 1-3 permit to obtain improved 200° C. $NO_x$ conversion as compared to the catalysts of Comparative Example 1 and the catalyst of Reference Example 5. Thus, it can be seen that the addition of Ce—$ZrO_X$ leads to an improvement in $NO_x$ conversion.

4.2 Backpressure

The catalysts were aged in an oven at 800° C. hydrothermally (20% $O_2$, 10% $H_2O$ in % $N_2$) for 16 hours. The cold flow backpressure data was recorded at a volume flow of 27 $m^3$/h at room temperature and was reported on FIG. 2. The backpressure obtained with the catalysts according to the present invention (Examples 1-3) is greatly reduced compared to the backpressure obtained with the catalyst of Comparative Example 1 and of Reference Example 5. Thus, it can be seen that the formulations that contain Ce—$ZrO_x$ lead to an improvement in $NO_x$ conversion as well as a reduction in backpressure.

Comparative Example 2: Process for Preparing a Selective Catalytic Reduction Catalyst Comprising a Zeolitic Material Comprising Copper not According to the Present Invention Slurry 1:

A CuO powder having a Dv50 of 33 micrometers was added to water. The amount of CuO was calculated such that the total amount of copper, calculated as CuO, in the coating after calcination was 3.5 weight-% based on the weight of the Chabazite. The resulting mixture was milled using a continuous milling apparatus so that the Dv50 value of the particles was about 2 micrometers and the Dv90 value of the particles was about 5 micrometers. The resulting slurry had a solid content of 8 weight-% based on the weight of said slurry. Acetic acid and an aqueous zirconium acetate solution was added to the CuO-containing mixture forming a slurry. The amount of acetic acid was calculated to be 1.7 weight-% of the Chabazite and the amount of zirconium acetate was calculated such that the amount of zirconia in the coating, calculated as $ZrO_2$, was 5 weight-% based on the weight of the zeolitic material. Separately, a Cu-CHA with a Cu content, calculated as CuO, of 1.25 weight-% based on the weight of the zeolitic material (Dv50 of 1.5 micrometers, a $SiO_2$:$Al_2O_3$ of 25, an average crystal size of less than 0.5 micrometer and a BET specific surface area of about 555 $m^2$/g), prepared as described in Reference Example 4, was added to water to form a mixture having a solid content of 37 weight-% based on the weight of said mixture. The Cu-CHA mixture was mixed to the copper containing slurry. The amount of the Cu-CHA was calculated such that the loading of zeolitic material after calcination was about 86% of the loading of the coating in the catalyst after calcination. The resulting slurry was milled using a continuous milling apparatus so that the Dv90 value of the particles was of about 5 micrometers.

Slurry 2:

Separately, an aqueous slurry having a solid content of 30 weight-% based on the weight of said slurry and comprising water and La-zirconia ($ZrO_2$ 90 weight-% with $La_2O_3$ 10 weight-% having a BET specific surface area of 68 $m^2$/g, a Dv90 of about 16 micrometers) was prepared. The amount of La-zirconia was calculated such that the amount of La-zirconia after calcination was 10 weight-% based on the weight of the Chabazite. The resulting slurry was milled using a continuous milling apparatus so that the Dv90 value of the particles was of about 5.5 micrometers.

Subsequently, slurries 1 and 2 were combined, the solid content of the obtained final slurry was adjusted to about 30 weight-% based on the total weight of said final slurry.

A porous uncoated wall-flow filter substrate, silicon carbide, (an average porosity of 60.5%, a mean pore size of 20 micrometers and 350 CPSI and 0.28 mm (11 mil) wall thickness, diameter: 1.5 inch (38.1 mm)*length: 6 inches (152.4 mm)) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 130° C. for 30 minutes and calcined at 450° C. for 2 hours. This was repeated once. The final coating loading after calcinations was about 1.8 g/in$^3$, including about 1.5 g/in$^3$ of CHA zeolitic material, 0.15 g/in$^3$ of La-zirconia, about 0.08 g/in$^3$ of zirconia and 3.5 weight-% of Cu, calculated as CuO, based on the weight of the CHA zeolitic material.

Example 5: Preparation of a Selective Catalytic Reduction Catalyst Comprising a Zeolitic Material Comprising Copper, a First Oxidic Material and a Second Oxidic Material According to the Present Invention In a first step, a Cu containing zeolitic material having a framework type CHA, with a Cu content, calculated as CuO, of about 1.25 weight-% based on the weight of the zeolitic material (Dv50 of 1.5 micrometers, a $SiO_2$:$Al_2O_3$ of 25, an average crystal size of less than 0.5 micrometer (SEM analysis) and a BET specific surface area of about 555 $m^2$/g), prepared as described in Reference Example 4, was added to an aqueous solution of copper acetate (3.51 weight-% of Cu, calculated as CuO). The aqueous copper acetate solution is provided in a quantity sufficient to fill the pores of the CHA zeolitic material by incipient wetness impregnation to obtain a Cu content, calculated as CuO, of about 3.5 weight-%. After the impregnation, the Cu-containing zeolitic material was calcined in air for 2 hours at 500° C.

In a second step, an alumina sol (a solid content 22-25 weight-%, a Dv50 of about 90 nm) was dispersed in water and impregnated on the calcined Cu-zeolitic material so that the weight percent of the alumina amounts to 10 weight-% based on the weight of the zeolitic material after calcination. After the impregnation, the Cu-zeolitic material+alumina was calcined in air for 2 hours at 500° C. Separately, acetic acid (1.7 weight-% based on the weight of the zeolitic material) and a zirconium acetate solution were dispersed in water. The amount of zirconium acetate was calculated such that the amount of zirconia in the coating, calculated as $ZrO_2$, was 5 weight-% based on the weight of the zeolitic material. Subsequently, the calcined Cu-zeolite+alumina was added to the acetic acid+zirconium acetate solution, forming a slurry. The resulting slurry was milled using a continuous milling apparatus so that the Dv90 value of the particles was of about 4 micrometers and the solid content of the obtained slurry was adjusted to 34 weight-% based on the weight of said slurry.

Separately, a cerium-aluminum oxide (Ce content, calculated as $CeO_2$, of about 50 weight-% based on the total weight of the Ce—Al oxide and Al content, calculated as $Al_2O_3$, of about 50 weight-% based on the total weight of the Ce—Al oxide, a BET specific surface area of 155 $m^2$/g, a Dv90 of 35 micrometers and a pore volume of 0.95 mL/g) was impregnated with an ammonium niobate(V) oxalate hydrate dispersed in water in a quantity sufficient to fill the pores of the Ce—Al oxide (incipient wetness impregnation) to obtain a Nb content, calculated as $Nb_2O_5$, of 10 weight-% based on the weight of the Ce—Al oxide. After the impregnation, the Nb+Ce—Al oxide was calcined in air for 2 hours at 590° C. The calcined Nb doped Ce—Al oxide was dispersed in water and the solid content of the slurry was adjusted to 38 weight-% based on the weight of the slurry.

Subsequently, the Cu-zeolitic material+alumina slurry was added to the Nb doped Ce—Al oxide slurry such that the amount of Ce—Al oxide is of 20 weight-% based on the weight of the zeolitic material. The solid content of the obtained slurry is adjusted to 31 weight-% based on the weight of said slurry.

The obtained slurry was coated twice on a porous uncoated wall-flow filter substrate, silicon carbide, (an average porosity of 60.5%, a mean pore size of 20 micrometers and 350 CPSI and 0.28 mm (11 mil) wall thickness, diameter: 1.5 inch (38.1 mm)*length: 6 inches (15.24 mm)) according to the process described in Comparative Example 2 in the foregoing. The final coating loading after calcinations was about 2.1 g/$in^3$, including about 1.48 g/$in^3$ of CHA zeolitic material, 0.15 g/$in^3$ of alumina, 0.33 g/$in^3$ of Nb doped Ce—Al oxide, about 0.075 g/$in^3$ of zirconia and 3.5 weight-% of Cu, calculated as CuO, based on the weight of the CHA zeolitic material.

Example 6: Preparation of a Selective Catalytic Reduction Catalyst Comprising a Zeolitic Material Comprising Copper, a First Oxidic Material and a Second Oxidic Material According to the Present Invention Slurry 1:

Said slurry was prepared as slurry 1 of Comparative Example 2.

Slurry 2:

Said slurry was prepared as slurry 2 of Comparative Example 1 except that an alumina ($Al_2O_3$ 95 weight-% with $SiO_2$ 5 weight-% having a BET specific surface area of about 180 $m^2$/g, a Dv90 of about 18 micrometers) was used to replace the one used in Comparative Example 1 and that the aqueous slurry had a solid content of 35 weight-%.

Separately, a cerium-zirconium mixed oxide (Ce content, calculated as $CeO_2$, of about 50 weight-% based on the total weight of the mixed oxide and Zr content, calculated as $ZrO_2$, of about 50 weight-% based on the total weight of the mixed oxide, and a pore volume of about 0.37 mL/g was added to a lanthanum nitrate solution (13.4% of lanthanum, calculated as $La_2O_3$) in a quantity sufficient to fill the pores of the mixed oxide (incipient wetness impregnation) to obtain a La content, calculated as $La_2O_3$, of 10 weight-% based on the weight of the mixed oxide. After the impregnation, the La+Ce—Zr mixed oxide was calcined in air for 2 hours at 590° C. The calcined La doped Ce—Zr oxide was dispersed in water and the solid content of the slurry was adjusted to 38 weight-% based on the weight of the slurry.

Subsequently, the Cu-zeolitic material+alumina slurry was added to the La doped Ce—Zr oxide slurry such that the amount of Ce—Zr oxide is of 20 weight-% based on the weight of the zeolitic material (amount of La-doped Ce—Zr is of 22 weight-% based on the weight of the zeolitic material). The solid content of the obtained slurry is adjusted to 31 weight-% based on the weight of said slurry.

The obtained slurry was coated twice on a porous uncoated wall-flow filter substrate, silicon carbide, (an average porosity of 60.5%, a mean pore size of 20 micrometers and 350 CPSI and 0.28 mm (11 mil) wall thickness, diameter: 1.5 inch (38.1 mm)*length: 6 inches (15.24 mm)) according to the process described in Comparative Example 2 in the foregoing. The final coating loading after calcinations was about 2.1 g/$in^3$, including about 1.48 g/$in^3$ of CHA zeolitic material, 0.15 g/$in^3$ of alumina, 0.33 g/$in^3$ of La doped Ce—Zr oxide, about 0.075 g/$in^3$ of zirconia and 3.5 weight-% of Cu, calculated as CuO, based on the weight of the CHA zeolitic material.

A recapitulative table is provided in the following.

TABLE 2

| | Zeolitic material | Ion-exchange method | 1st oxidic material | wt.-%* | 2nd oxidic material | wt.-%* | Final washcoat loading (g/in$^3$) |
|---|---|---|---|---|---|---|---|
| Comp. Ex. 2 | Cu-CHA (SAR:25) | ISIE[b] | La-zirconia | 10 | — | — | 2.0 |
| Ex. 5 | Cu-CHA (SAR:25) | Impregnation Cu acetate[c] | alumina sol | 10 | Nb (10 wt.-%) $Ce_{0.5}Al_{0.5}O_x$ | 22 | 2.1 |
| Ex. 6 | Cu-CHA (SAR:25) | ISIE[b] | silica-alumina | 10 | La (10 wt.-%) $Ce_{0.5}Zr_{0.5}O_x$ | 22 | 2.1 |

[b]ISIE, In-situ ion-exchange of a pre-exchanged zeolitic material (Cu content, calculated as CuO, of 1.25 weight-% based on the weight of the zeolitic material).
[c]Impregnation of Cu acetate on a pre-exchanged zeolitic material (Cu content, calculated as CuO, of 1.25 weight-% based on the weight of the zeolitic material).
*based on the weight of the zeolitic material.
SAR: silica to alumina molar ratio.

Analytics

XRD characterization was performed on the $Nb_{10}Ce_{0.5}Al_{0.5}$-oxide after calcination (Ex. 5—see FIG. 8). No mixed oxide phase is found but both, an $Al_2O_3$ and a $CeO_2$ phase were observed. Thus, the obtained oxide is a mixture of Al and Ce oxides. No Nb oxides were detected either because Nb does not form a crystalline phase or the amount is below the detection limit.

Example 7: Testing of the Catalysts of Comparative Example 1, Reference Example 5 and Examples 1 to 3—$NO_X$ Conversion $NO_X$ Conversion The catalysts were aged in an oven at 800° C. hydrothermally (20% $O_2$, 10% $H_2O$ and 70% $N_2$) for 16 hours. The $NO_X$ conversion of the aged catalysts at 20 ppm ammonia slip was measured on a reactor equipped with two Fourier Transform Infrared Spectrometers in which 1.5 inch cores can be measured. The measurements were done at 200° C. and 600° C., at a space velocity of 40 k/h and 80 k/h (500 ppm NO, $NH_3/NO_X$=1.5, 5% CO2, 5% $H_2O$, 80 ppm $C_3H_6$). The results are displayed on FIG. 3.

As may be taken from FIGS. 3 and 4, the catalysts of Examples 5 and 6 permit to obtain improved $NO_x$ conversion at 40 k/h and 80 k/h at high temperature (600° C.) compared to the catalyst of Comparative Example 2 while exhibiting similar $NO_x$ conversion at low temperature (200° C.) as to the catalyst of Comparative Example 2. Thus, it can be seen that the addition of the second oxidic material permits to improved $NO_x$ conversion.

Reference Example 6: Effect of Different First Oxidic Materials

The slurries and catalysts are prepared analogue to the slurries of Example 6 but without the second oxidic material and a first oxidic material content of 20 weight-% instead of 10 weight-%, a summary is given in Table 3 below. The coating was performed as in Example 5 but on a porous uncoated wall-flow filter core, silicon carbide, (an average porosity of 63%, a mean pore size of 20 micrometers and 300 CPSI and 0.304 mm (12 mil) wall thickness, diameter: 58 mm*length: 140.5 mm)

TABLE 3

| | Zeolitic material | Ion-exchange method | 1st oxidic material | wt.-%* | 2nd oxidic material | wt.-%* | Final washcoat loading (g/in$^3$) |
|---|---|---|---|---|---|---|---|
| Ref. Ex. 6.1 | Cu-CHA (SAR:25) | Impregnation Cu acetate[b1] | silica-alumina | 20 | — | — | 1.8 |
| Ref. Ex. 6.2 | Cu-CHA (SAR:25) | Impregnation Cu acetate[b1] | La-zirconia | 20 | — | — | 1.8 |
| Ref. Ex. 6.3 | Cu-CHA (SAR:25) | Impregnation Cu acetate[b1] | alumina sol | 20 | — | — | 1.8 |

[b1]Impregnation of Cu acetate on a pre-exchanged zeolitic material (Cu content, calculated as CuO, of 1.25 weight-% based on the weight of the zeolitic material).

*based on the weight of the zeolitic material.

SAR: silica to alumina molar ratio.

NOx Conversion

The catalysts were aged in an oven at 800° C. hydrothermally (20% $O_2$, 10% $H_2O$ and 70% $N_2$) for 16 hours. The NOx conversion of the aged catalysts at 20 ppm ammonia slip was measured on a 2 L Euro 6 engine at a temperature of 575° C., a space velocity of 94 k/h, a $NO_X$ concentration of 90 ppm and 20 ppm HC (concentration based on the content of carbon atoms). The results are displayed on FIG. 5.

The high T $NO_x$ conversion, displayed in FIG. 6, is considered approximately equivalent for the three designs (Ref. Examples 6.1-6.3). Accordingly, the designs containing the silica-alumina, the La-zirconia and the alumina sol as a first oxidic material lead to approximately the same high T $NO_x$ conversion.

Backpressure

The catalysts were aged in an oven at 800° C. hydrothermally (20% $O_2$, 10% $H_2O$ and 70% $N_2$) for 16 hours. The cold flow backpressure data recorded at a volume flow of 65 $m^3$/h was reported on FIG. 6 and has been measured at room temperatures. The back pressure is reduced for the design containing the alumina sol, a minor advantage in back pressure for the design with the La-zirconia is observed as well.

Reference Example 7: Effect of Different Oxidic Materials

Ref Ex. 7.1 was prepared by preparing a slurry of a Chabazite with a silica to alumina (SAR) of 25 with a Cu content, calculated as CuO, of 3.75 weight-% based on the weight of the Chabazite with a solid content of 30 weight-% based on the weight of the slurry. Said slurry was milled for 5 minutes at 300 rpm. The slurry was dried under stirring, calcined for 1 hour at 550° C. (heating rate 5K/min), crushed and sieved 250-500 micrometers.

A. General Blending/Shaping Procedure

1. Take Cu-zeolite
2. Set to slurry (about 30 weight-% solid content)
3. Mill (5 min, 300 rpm)
4. Mix an aliquot of slurry with oxidic material powder from B (if necessary) or another oxidic material powder
5. Dry under stirring
6. Calcine for 1 hour at 550° C. (heating rate 5K/min)
7. Crush
8. Sieve 250-500 micrometers.

B. Impregnation Procedure

1. Take carrier material
2. Impregnate with metal precursor solution
3. Mix, ensure uniform dispersion
4. Dry
5. Calcine for 1 hour at 550° C. (heating rate 5K/min)
6. Crush in mortar Ref Ex. 7.2: The Chabazite used in Reference Example 7.1 was diluted with an $\alpha$-$Al_2O_3$ so that the total amount of Chabazite is the same as for Reference Example 7.1 (see Table 4). The amount of $\alpha$-$Al_2O_3$ is 20 weight-% based on the weight of the Chabazite.

Ref Ex. 7.3: A silica-alumina (95 weight-% alumina, 5 weight-% silica, a Dv90 of 5 micrometers, a BET specific surface area of 180 $m^2$/g) was added to the Chabazite slurry of Reference Example 1 so that the amount of silica-alumina is 20 weight-% based on the weight of the Chabazite (see Table 4).

Ref Ex. 7.4 to 7.14 were prepared according to the aforementioned general procedure (A+B). The compositions of each samples were recapitulated in Tables 4 and 5 below.

TABLE 4

NOx conversion at a space velocity (SV) of 80 k/h, 50 ppm NO, 500 ppm $NH_3$, 5% $H_2O$, 10% $O_2$ in $N_2$, the shown values are detected at a constant $NH_3$ slip (Steady state conditions)

| Ref. Ex. | Cu-zeolite* (SAR: 25) | Dopant | Oxidic material (20 wt.-%**) | NOx conversion (% at 200° C.) | NOx conversion (% at 575° C.) |
|---|---|---|---|---|---|
| 7.1 | Cu-CHA | | | 37 | 76 |
| 7.2 | Cu-CHA | | $\alpha$-$Al_2O_3$ | 32 | 78 |
| 7.3 | Cu-CHA | | silica-alumina | 33 | 84 |
| 7.4 | Cu-CHA | 5 wt.-% La | $Ce_{0.5}Zr_{0.5}O_x$ | 43 | 75 |
| 7.5 | Cu-CHA | 5 wt.-% Nb | $Ce_{0.5}Zr_{0.5}O_x$ | 37 | 76 |
| 7.6 | Cu-CHA | 5 wt.-% Nb | $Ce_{0.73}Zr_{0.20}La_{0.02}Nd_{0.05}O_x$ | 39 | 74 |
| 7.7 | Cu-CHA | 5 wt.-% Nb | $Zr_{0.9}La_{0.1}$ | 39 | 70 |

*Cu-CHA with a Cu content, calculated as CuO, of 3.75 weight-% (a Dv90 of 4.5 micrometers, a BET specific surface area of 555 $m^2$/g)
**based on the weight of the zeolite.

TABLE 5

NOx conversion at a SV of 80 k/h, 50 ppm NO, 500 ppm $NH_3$, 5% $H_2O$, 10% $O_2$ in $N_2$, the shown values are detected at a constant $NH_3$ slip (Steady state conditions)/The NOx conversions in +/− % are given relative to the conversion of Ref. Example 7.1 (The percentages indicated in Table 5 relative to the NOx conversion are the relative increase or decrease compared to the reference values of Reference Example 7.1 which presents a NOx conversion of 37% at 200° C. and of 76% at 575° C.)

| Ref. Ex. | Cu-zeolite* (SAR: 25) | Dopant | Oxidic material (20 wt.-%**) | NOx conversion (200° C.) | NOx conversion (575° C.) |
|---|---|---|---|---|---|
| 7.1 | Cu-CHA | — | — | ref. | ref. |
| 7.8 | Cu-CHA | 10 wt.-% La | $Ce_{0.5}Zr_{0.5}O_x$ | +4% | +3% |
| 7.9 | Cu-CHA | 15 wt.-% La | $Ce_{0.5}Zr_{0.5}O_x$ | +2% | +2% |
| 7.10 | Cu-CHA | — | $Ce_{0.5}Zr_{0.5}O_x$ | −6% | −3% |
| 7.11 | Cu-CHA | — | $Ce_{0.5}Al_{0.5}O_x$ | −4% | −7% |
| 7.12 | Cu-CHA | 5 wt.-% La | $Ce_{0.5}Al_{0.5}O_x$ | +2% | +8% |
| 7.13 | Cu-CHA | 10 wt.-% La | $Ce_{0.5}Al_{0.5}O_x$ | +5% | +3% |
| 7.14 | Cu-CHA | 10 wt.-% Nb | $Ce_{0.5}Al_{0.5}O_x$ | +7% | +7% |

*Cu-CHA with a Cu content, calculated as CuO, of 3.75 weight-% (a Dv90 of 4.5 micrometers, a BET specific surface area of 555 $m^2$/g)
**based on the weight of the zeolite $Ce_{0.73}Zr_{0.20}La_{0.02}Nd_{0.05}O_x$: a BET specific surface area of 60 $m^2$/g $Zr_{0.9}La_{0.1}$: a Dv90 of 8 micrometers and a BET specific surface area of 67.5 $m^2$/g)

$Ce_{0.5}Al_{0.5}O_x$: a Dv90 of 35 micrometers, a BET specific surface area of 155 $m^2$/g and a pore volume of 0.95 ml/g The data provided in the table above show that the use of Ce—Zr oxides doped with 10-15 weight-% of $LaO_x$ or Ce—Al oxides doped with 10 weight-% $NbO_x$ or 10 weight-% $LaO_x$ permits to improve the $NO_x$ conversion as compared to the reference.

Reference Example 8 Determination of the Average Crystal Size of a Zeolitic Material The average crystal size of a zeolitic material was determined by analyzing the zeolitic material powder with TEM (transmission electron microscopy) images. The size of individual crystals was determined by averaging the crystal size from 20 to 30 individual crystals from at least two TEM images done with a magnification in the range of from 5 000 to 12 000.

CITED LITERATURE

Figure 1:
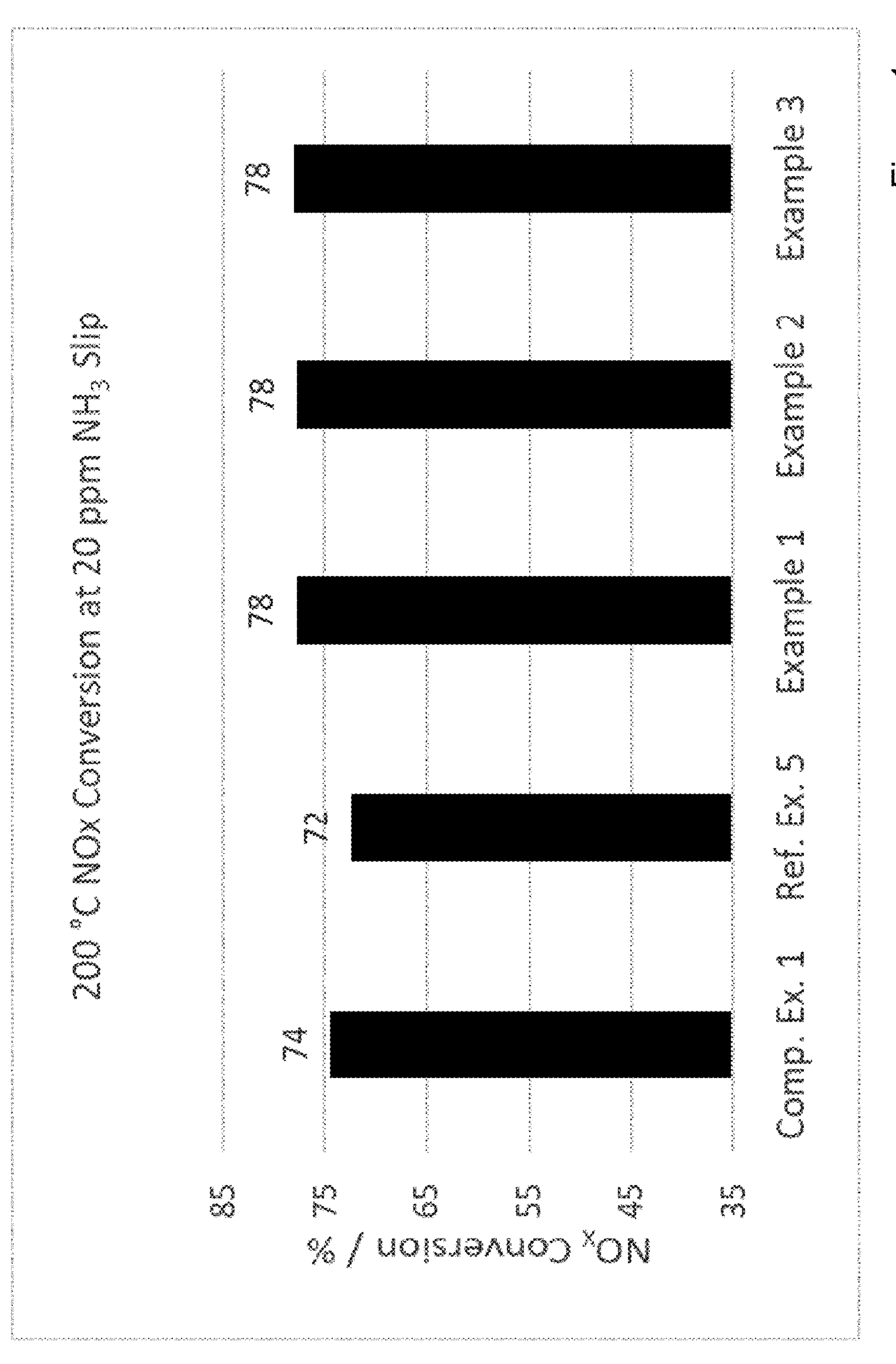
FIG. 1 shows the $NO_x$ conversion measured for the catalysts of Examples 1-3, of Comparative Example 1 and of Reference Example 5 at 200° C. (20 ppm $NH_3$ slip—space velocity of 40 k/h).
Figure 2:
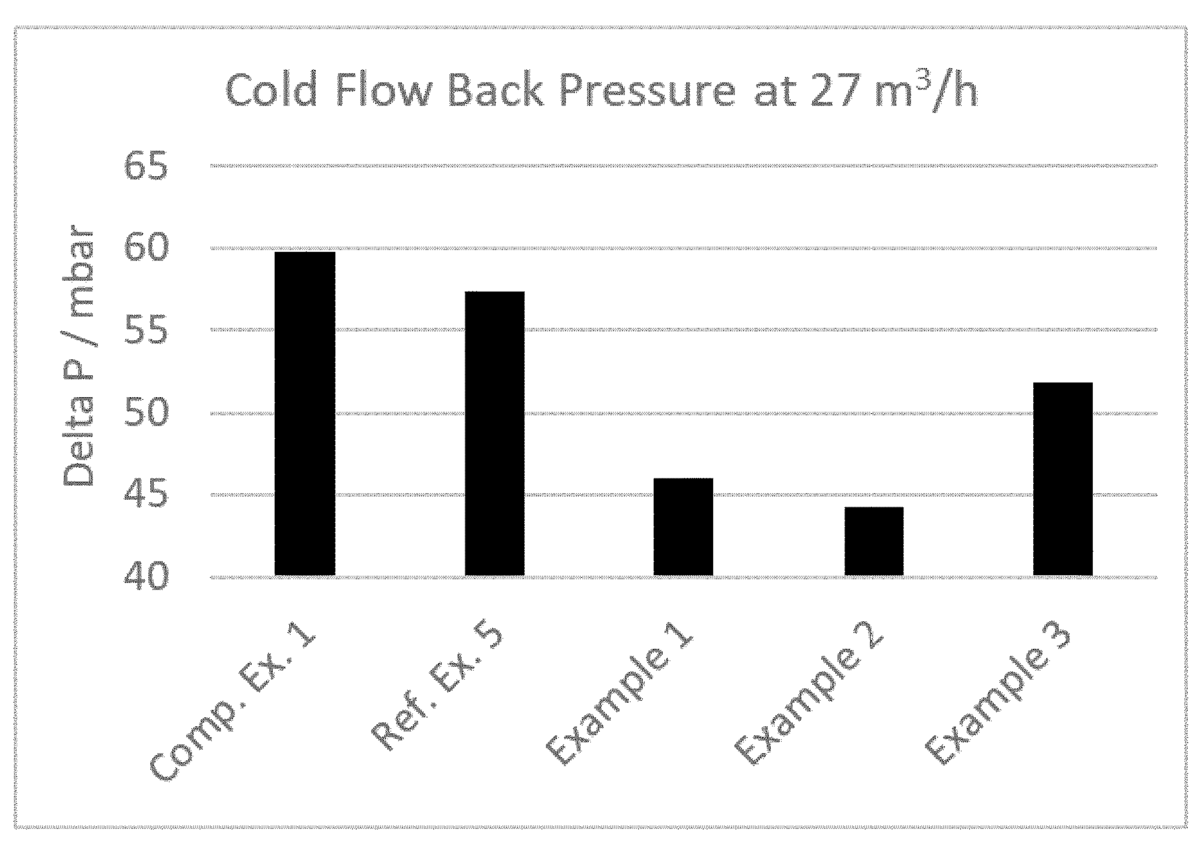
FIG. 2 shows the backpressure measured for the catalysts of Examples 1-3, of Comparative Example 1 and of Reference Example 5 at 293 K (flow rate 27 $m^3$/h).
Figure 3:
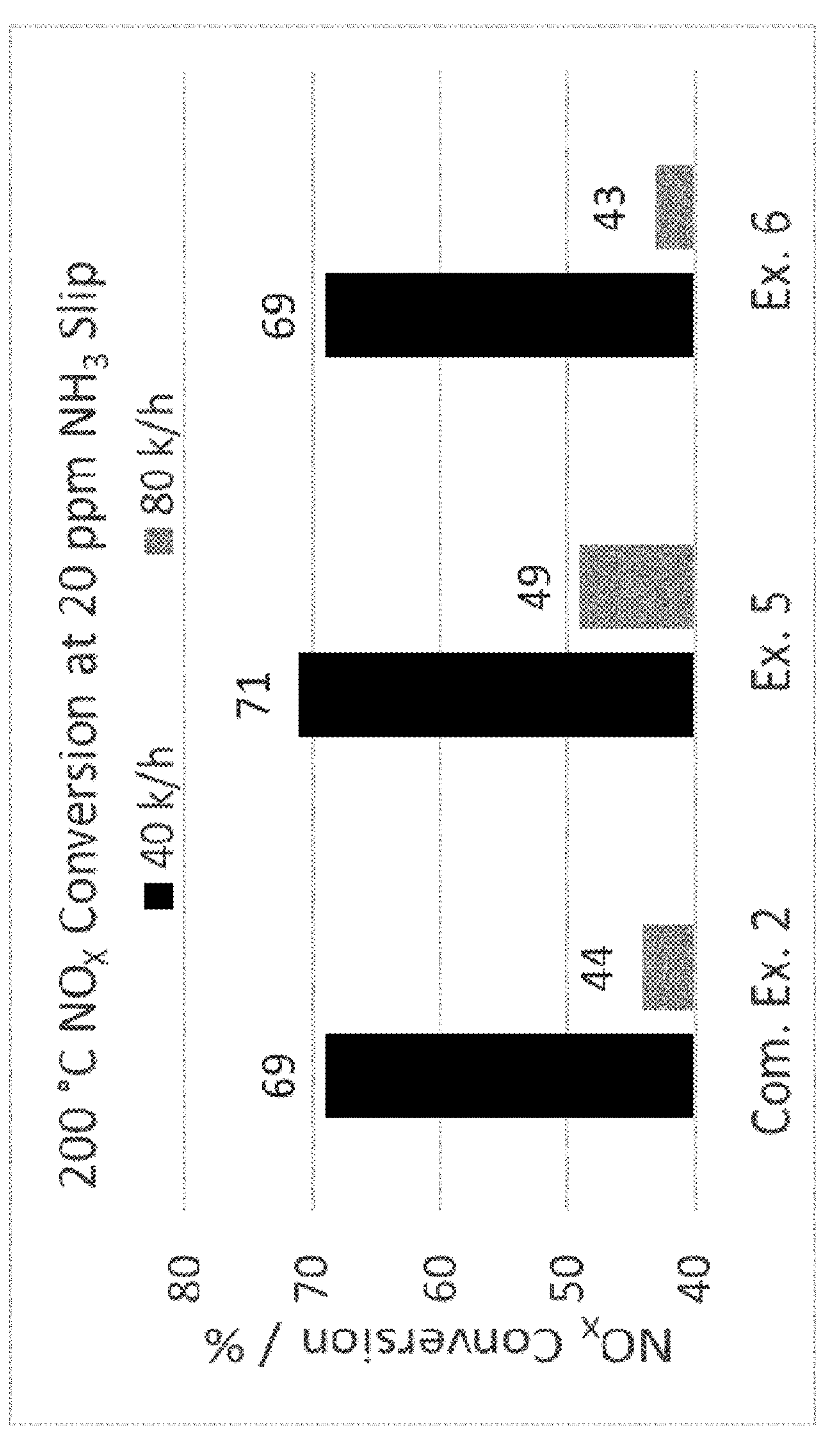
FIG. 3 shows the $NO_x$ conversion measured for the catalysts of Examples 5 and 6, and of Comparative Example 2 at 200° C. (20 ppm $NH_3$ slip—space velocity of 40 k/h and 80 k/h).
Figure 4:
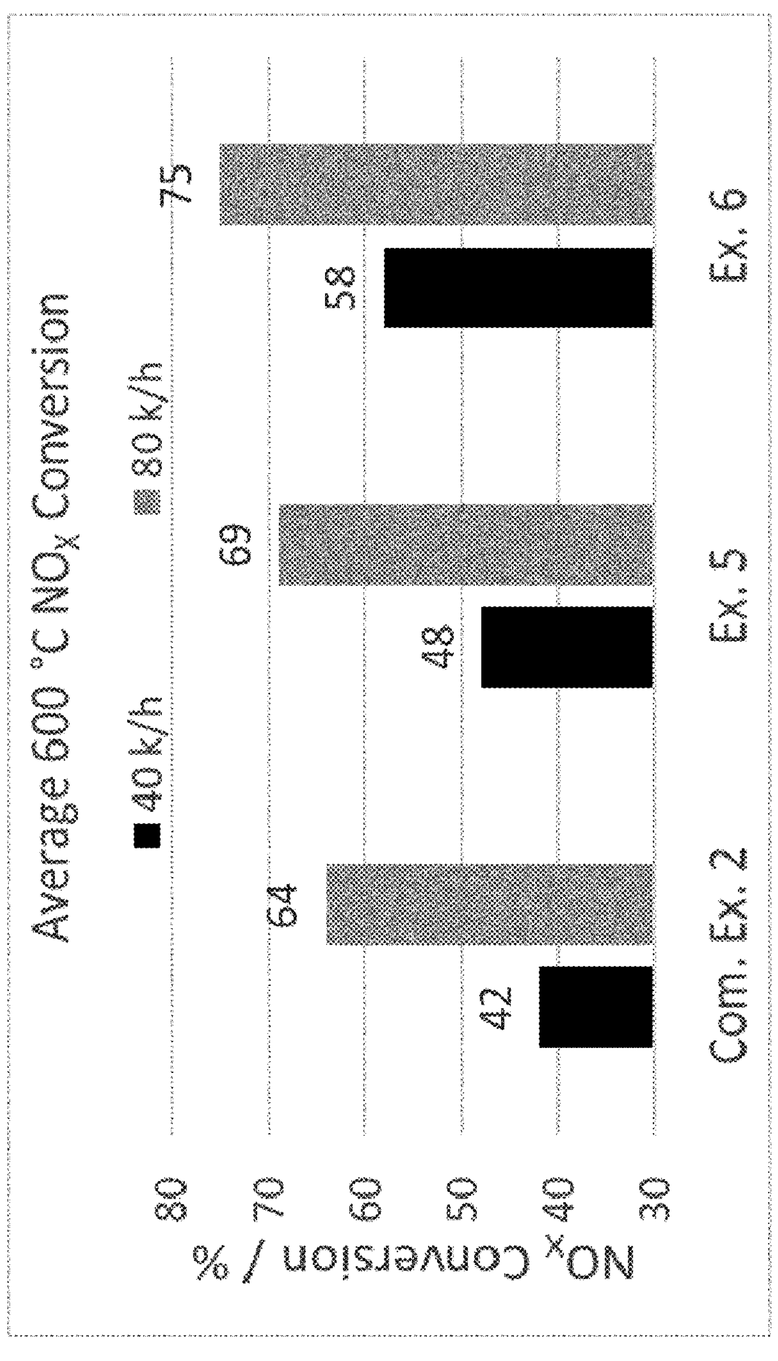
FIG. 4 shows the $NO_x$conversion measured for the catalysts of Examples 5 and 6, and of Comparative Example 2 at 600° C. (20 ppm $NH_3$ slip—space velocity of 40 k/h and 80 k/h).
Figure 5:
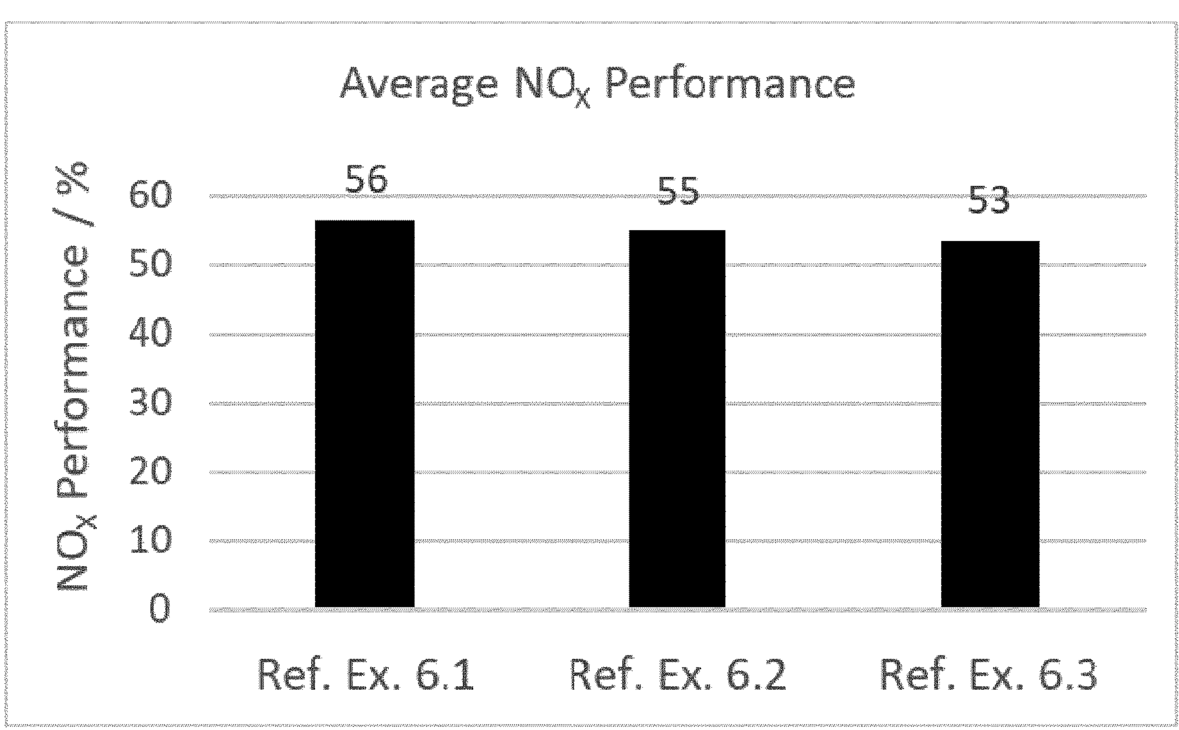
FIG. 5 shows the $NO_x$ conversion measured for the catalysts of Reference Examples 6.1-6.3 at 575° C. (20 ppm $NH_3$ slip—space velocity of 94 k/h).
Figure 6:
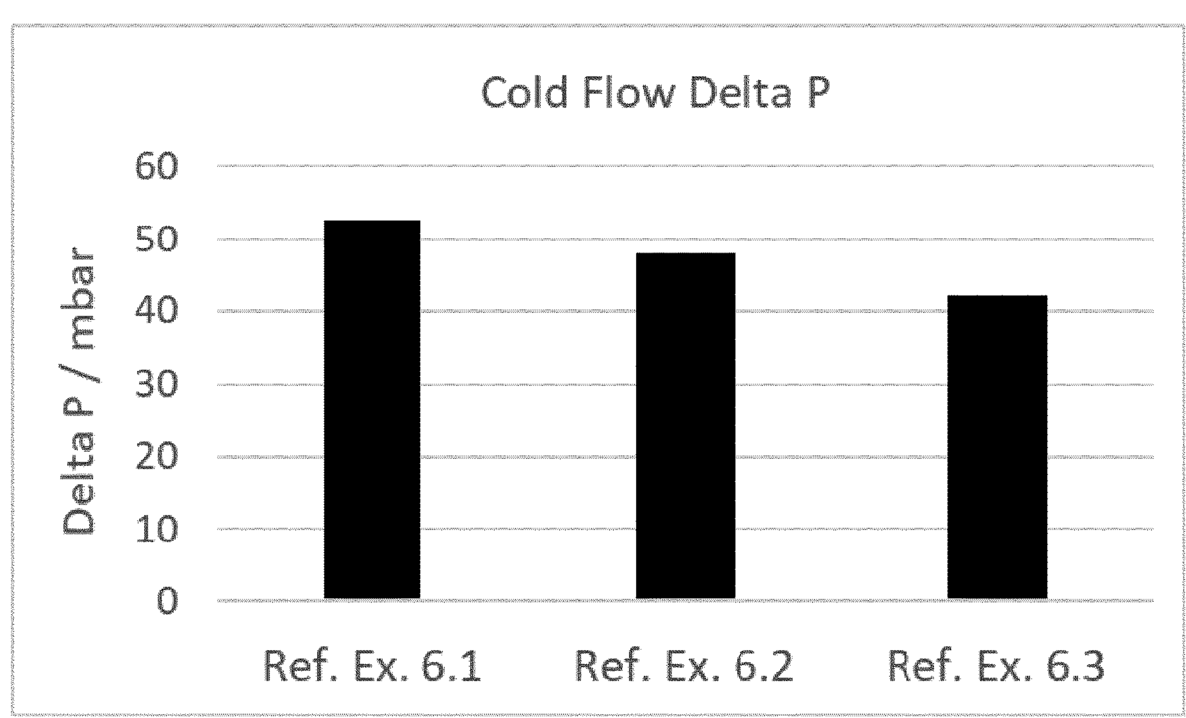
FIG. 6 shows the backpressure measured for the catalysts of Reference Examples 6.1-6.3 at 293 K (flow rate 65 $m^3$/h).
Figure 7:
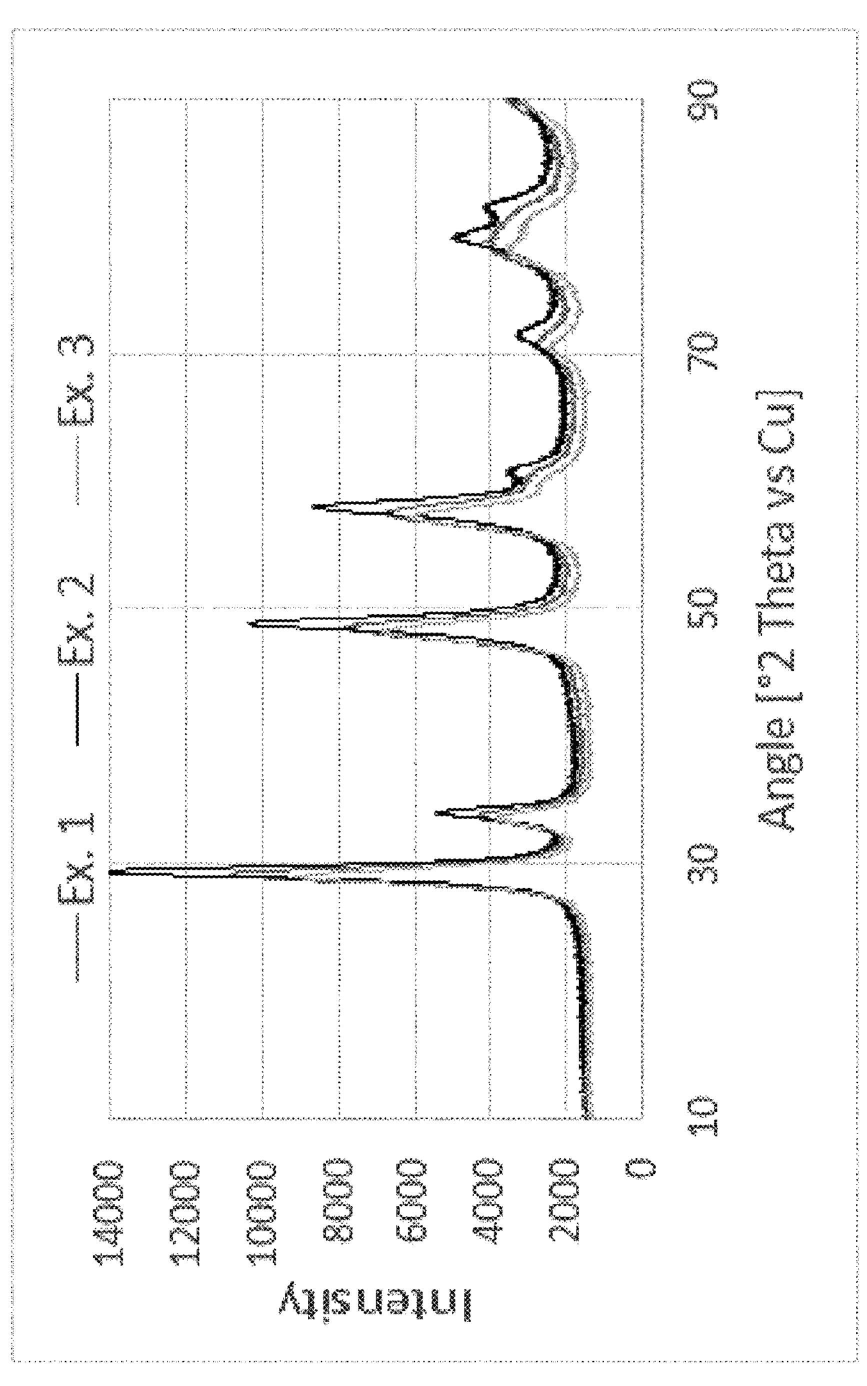
FIG. 7 shows the XRD analysis of Examples 1 to 3.
Figure 8:
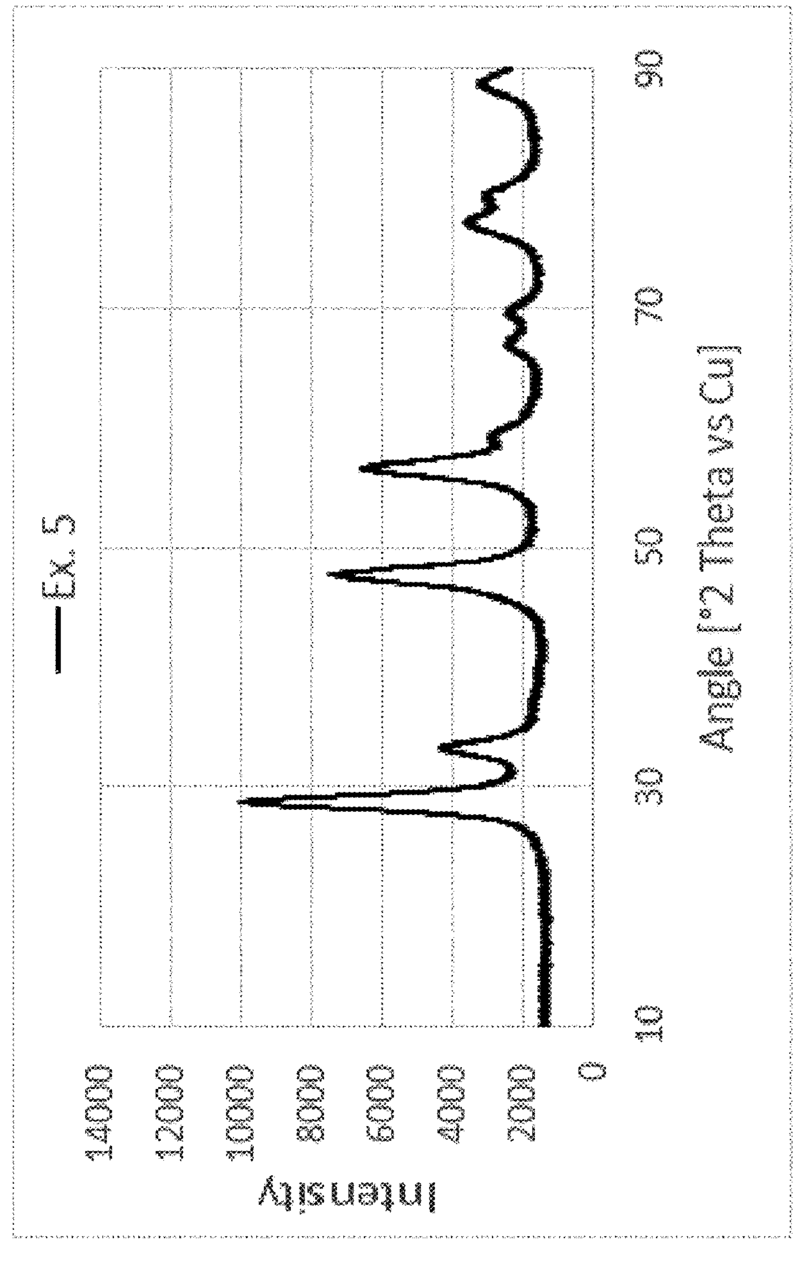
FIG. 8 shows the XRD analysis of Example 5.

US 2011/0142737 A1
DE 102011012799 A1
US 2013/0156668 A1

The invention claimed is:

1. A selective catalytic reduction catalyst for treating an exhaust gas of a combustion engine, the catalyst comprising:

(i) a substrate comprising an inlet end, an outlet end, a substrate axial length extending from the inlet end to the outlet end, and a plurality of passages defined by internal walls of the substrate extending therethrough;

(ii) a coating disposed on the substrate (i), the coating comprising a first non-zeolitic oxidic material comprising aluminum, a second non-zeolitic oxidic material comprising cerium and one or more of zirconium, aluminum, silicon, lanthanum, niobium, iron, manganese, titanium, tungsten, copper, molybdenum, neodymium, cobalt, chromium, tin and praseodymium, and the coating further comprising an 8-membered ring pore zeolitic material comprising one or more of copper and iron;

wherein 70 weight-% to 80 weight-% of the coating consists of the 8-membered ring pore zeolitic material comprising one or more of copper and iron.

2. The catalyst of claim 1, wherein the first non-zeolitic oxidic material comprises alumina, wherein from 98 weight-% to 100 weight-%, of the first non-zeolitic oxidic material consist of alumina, and wherein the first non-zeolitic oxidic material has a BET specific surface area in the range of from 120 $m^2$/g to 300 $m^2$/g.

3. The catalyst of claim 1, wherein the first non-zeolitic oxidic material further comprises one or more of zirconium, silicon and titanium.

4. The catalyst of claim 1, wherein the first non-zeolitic oxidic material is comprised in the coating (ii) in an amount ranging from 2 weight-% to 28 weight-%, based on the weight of the 8-membered ring pore zeolitic material.

5. The catalyst of claim 1, wherein the second non-zeolitic oxidic material comprised in the coating (ii) comprises a mixed oxide of cerium and one or more of zirconium, aluminum, silicon, lanthanum, niobium, iron, manganese, titanium, tungsten, copper, molybdenum, neodymium, cobalt, chromium, tin and praseodymium, or a mixture of a cerium oxide and an oxide of one or more of zirconium, aluminum, silicon, lanthanum, niobium, iron, manganese, titanium, tungsten, copper, molybdenum, neodymium, cobalt, chromium, tin, and praseodymium.

6. The catalyst of claim 5, wherein the second non-zeolitic oxidic material comprised in the coating (ii) comprises a mixed oxide of cerium and one or more of zirconium, aluminum, silicon, lanthanum, niobium, iron, manganese, titanium, tungsten, copper, molybdenum, neodymium, cobalt, chromium, tin and praseodymium.

7. The catalyst of claim 6, wherein the mixed oxide of cerium and zirconium has a crystalline phase $CeaZrpaO_2$, wherein a ranges from 0.1 to 0.9.

8. The catalyst of claim 5, wherein the second non-zeolitic oxidic material comprised in the coating (ii) comprises a mixture of a cerium oxide and one or more of a zirconium oxide, an aluminum oxide, a silicon oxide, a lanthanum oxide, a niobium oxide, an iron oxide, a manganese oxide, a titanium oxide, a tungsten oxide, a copper oxide, a molybdenum oxide, a neodymium oxide, a cobalt oxide, a chromium oxide, a tin oxide and a praseodymium oxide.

9. The catalyst of claim 1, wherein a ratio of the weight of the first non-zeolitic oxidic material, (w1), to the weight of the second non-zeolitic oxidic material, (w2), defined as (w1):(w2), ranges from 0.2:1 to 0.7:1.

10. The catalyst of claim 1, wherein the 8-membered ring pore zeolitic material comprised in the coating (ii) has a framework type selected from the group consisting of CHA, AEI, RTH, LEV, DDR, KFI, ERI, AFX, LTA, a mixture of two or more thereof, and a mixed type of two or more thereof.

11. The catalyst of claim 1, wherein the 8-membered ring pore zeolitic material comprised in the coating (ii), having a framework type CHA, comprises crystals having an average crystal size in the range of from 0.05 micrometers to 5 micrometers.

12. The catalyst of claim 1, wherein the substrate is a wall-flow filter substrate or a flow-through substrate.

13. An exhaust gas treatment system for treating an exhaust gas stream exiting a combustion engine, wherein the exhaust gas treatment system having an upstream end for introducing the exhaust gas stream into the exhaust gas treatment system, wherein the exhaust gas treatment system comprises a first selective catalytic reduction catalyst according to claim 1, and one or more of a diesel oxidation catalyst, a second selective catalytic reduction catalyst, an ammonia oxidation catalyst, a diesel oxidation catalyst containing a NOx storage function, and a particulate filter.

14. The catalyst of claim 1, wherein the second non-zeolitic oxidic material comprises a mixed oxide of cerium and aluminum.

15. The catalyst of claim 14, wherein the second non-zeolitic oxidic material further comprises an oxide of niobium.

16. A selective catalytic reduction catalyst for treating an exhaust gas of a combustion engine, the catalyst comprising:

(i) a substrate comprising an inlet end, an outlet end, a substrate axial length extending from the inlet end to the outlet end, and a plurality of passages defined by internal walls of the substrate extending therethrough;

(ii) a coating disposed on the substrate (i), the coating comprising a first non-zeolitic oxidic material comprising aluminum, a second non-zeolitic oxidic material comprising a mixed oxide of cerium and aluminum, the second non-zeolitic oxidic material further comprising an oxide of niobium, and the coating further comprising an 8-membered ring pore zeolitic material comprising one or more of copper and iron;

wherein at least 65 weight-% of the coating consists of the 8-membered ring pore zeolitic material comprising one or more of copper and iron.

* * * * *